United States Patent
Wakamatsu

(10) Patent No.: US 10,482,342 B2
(45) Date of Patent: Nov. 19, 2019

(54) SEARCH APPARATUS, IMAGING APPARATUS INCLUDING THE SAME, AND SEARCH METHOD

(71) Applicant: CANON KABUSHIKI KAISHA, Tokyo (JP)

(72) Inventor: Nobushige Wakamatsu, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 42 days.

(21) Appl. No.: 15/709,179

(22) Filed: Sep. 19, 2017

(65) Prior Publication Data
US 2018/0082144 A1  Mar. 22, 2018

(30) Foreign Application Priority Data
Sep. 21, 2016  (JP) ................... 2016-183797

(51) Int. Cl.
  *G06K 9/32*   (2006.01)
  *H04N 5/232*  (2006.01)

(52) U.S. Cl.
  CPC ....... *G06K 9/3241* (2013.01); *H04N 5/23219* (2013.01); *H04N 5/23264* (2013.01); *H04N 5/23299* (2018.08); *G06T 2207/20084* (2013.01); *G06T 2207/20104* (2013.01)

(58) Field of Classification Search
  CPC ............ G06K 9/3241; H04N 5/23299; H04N 5/23219; H04N 5/23264; G06T 2207/20104; G06T 2207/20084
  See application file for complete search history.

(56) References Cited

U.S. PATENT DOCUMENTS

| | | | |
|---|---|---|---|
| 6,507,366 B1* | 1/2003 | Lee ................ | H04N 5/232 348/169 |
| 7,593,057 B2* | 9/2009 | Yee ................ | G02B 27/2228 348/151 |
| 2011/0285808 A1* | 11/2011 | Feng ............. | H04N 7/142 348/14.09 |

FOREIGN PATENT DOCUMENTS

| | | |
|---|---|---|
| JP | 2001268425 A | 9/2001 |
| JP | 2004128975 A | 4/2004 |

\* cited by examiner

*Primary Examiner* — Jon Chang
(74) *Attorney, Agent, or Firm* — Canon U.S.A., Inc. IP Division

(57) ABSTRACT

A search apparatus includes a division unit configured to perform division into areas for respective angle regions in space coordinates with an imaging apparatus set as an origin thereof, a calculation unit configured to calculate an importance level of a subject for each of the areas obtained by division, and a changing unit configured to change a center position of a field angle of a captured image in which to search for a subject based on the importance level of a subject calculated for each of the areas.

22 Claims, 22 Drawing Sheets

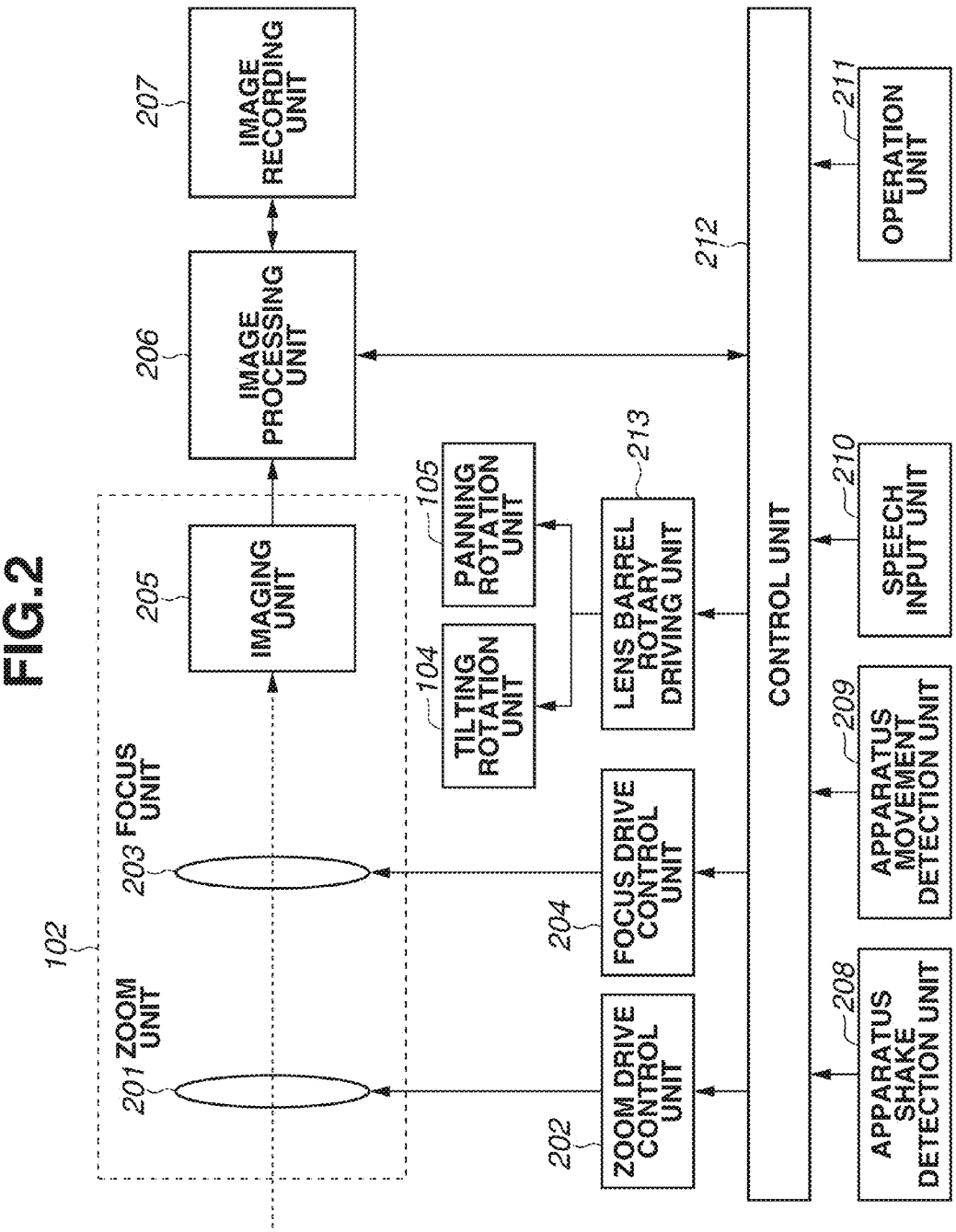

FIG.14

| AREA | PRESENT TIME TO TIME T1 | TIME T1 TO TIME T2 | TIME T2 TO TIME T3 | TIME T3 TO TIME T4 | ... |
|---|---|---|---|---|---|
| Area1 | 0 SHOTS | 0 SHOTS | 0 SHOTS | 2 SHOTS | |
| Area2 | 1 SHOT | 1 SHOT | 1 SHOT | 0 SHOTS | |
| Area3 | 3 SHOTS | 4 SHOTS | 2 SHOTS | 0 SHOTS | |
| Area4 | 2 SHOTS | 2 SHOTS | 1 SHOT | 0 SHOTS | |

| PERSONAL REGISTRATION SUBJECT | PRESENT TIME TO TIME T1 | TIME T1 TO TIME T2 | TIME T2 TO TIME T3 | TIME T3 TO TIME T4 |
|---|---|---|---|---|
| Asan | 3 SHOTS | 2 SHOTS | 0 SHOTS | 0 SHOTS |
| Bsan | 1 SHOT | 2 SHOTS | 1 SHOT | 0 SHOTS |
| Csan | 0 SHOTS | 0 SHOTS | 1 SHOT | 4 SHOTS |
| Dsan | 3 SHOTS | 0 SHOTS | 0 SHOTS | 0 SHOTS |

FIG.16

| REGISTERED OBJECT SUBJECT | PRESENT TIME TO TIME T1 | TIME T1 TO TIME T2 | TIME T2 TO TIME T3 | TIME T3 TO TIME T4 | ... |
|---|---|---|---|---|---|
| DOG | 2 SHOTS | 1 SHOT | 0 SHOTS | 0 SHOTS | |
| CAT | 0 SHOTS | 0 SHOTS | 1 SHOT | 0 SHOTS | |
| ... | | | | | |

FIG.17

| SCENE | PRESENT TIME TO TIME T1 | TIME T1 TO TIME T2 | TIME T2 TO TIME T3 | TIME T3 TO TIME T4 |
|---|---|---|---|---|
| BLUE SKY | 0 SHOTS | 0 SHOTS | 2 SHOTS | 2 SHOTS |
| EVENING VIEW | 2 SHOTS | 0 SHOTS | 0 SHOTS | 0 SHOTS |
| NATURAL VERDURE | 0 SHOTS | 0 SHOTS | 1 SHOT | 4 SHOTS |
| NIGHT VIEW | 0 SHOTS | 0 SHOTS | 0 SHOTS | 0 SHOTS |

1901

| 1902 | 1905 | 1907 |
| 1903 | 1901 | 1908 |
| 1904 | 1906 | 1909 |

SEARCH APPARATUS, IMAGING APPARATUS INCLUDING THE SAME, AND SEARCH METHOD

BACKGROUND DISCLOSURE

Field of the Disclosure

Aspects of the present disclosure generally relate to a search apparatus which searches the field angle (angle-of-view) position of a captured image obtained by an imaging apparatus such a digital camera.

Description of the Related Art

Some imaging apparatuses, such as digital cameras, involve fully automated operations important for image capturing, such as exposure determination and focus adjustment.

Moreover, there is proposed a control apparatus which performs rotary driving of a camera in panning directions or tilting directions so as to search for a subject.

Then, the control apparatus can detect a person using a face detection function or a human body detection function of detecting the face or human body of a person included in the subject and can track the subject by performing focusing control, exposure control, or panning and tilting rotations according to information about the detected person.

Japanese Patent Application Laid-Open No. 2001-268425 discusses an automatic tracking apparatus which automatically changes an image capturing direction by performing panning and tilting of a camera with motor drive, thus automatically tracking a moving subject.

Furthermore, with regard to image recognition, among neural networks, a computation method called "convolutional neural networks (CNN)" is known as a method of enabling pattern recognition robust with respect to a variation in recognition object. As an example in which CNN is applied to such face recognition or object recognition, there is proposed a technique such as that discussed in Japanese Patent Application Laid-Open No. 2004-128975.

However, an imaging system which tracks a subject by panning or tilting a camera according to the position of the subject has the following issues.

<Influence on Electric Power>

To perform rotary driving for panning or tilting, electric power for motor driving would be consumed.

While there is no problem in a case where electric power can be constantly supplied such as in the case of a monitoring system, it is difficult to operate a system for a long time while constantly performing driving for panning or tilting in a case where the total power capacity is limited such as in the case of usage with battery driving.

<Issue of Search Time for Subject in Automatic Shooting>

In the case of a camera which performs automatic shooting while searching for a subject by panning or tilting driving, when constantly tracking the same subject, the camera can shoot only the same subject.

During automatic shooting, the camera performs automatic shooting while searching for various different subjects and changing subjects. Here, if subject search is performed while continuing constantly panning or tilting the camera to a great extent, searching for a subject would be time-consuming.

SUMMARY

Aspects of the present disclosure are generally directed to providing a search apparatus for searching for a subject, which is capable of shortening a search time required for searching a subject and of reducing electric power required for driving.

According to an aspect of the present disclosure, a search apparatus includes a division unit configured to perform division into areas for respective angle regions in space coordinates with an imaging apparatus set as an origin thereof, a calculation unit configured to calculate an importance level of a subject for each of the areas obtained by division, and a charging unit configured to change a center position of a field angle of a captured image in which to search for a subject based on the importance level of a subject calculated for each of the areas.

Further features of the present disclosure will become apparent from the following description of exemplary embodiments with reference to the attached drawings.

BRIEF DESCRIPTION OF THE DRAWINGS

FIG. 2 illustrates a configuration of the imaging apparatus according to an exemplary embodiment of the subject disclosure.

FIG. 14 illustrates management of the number of shots for each area in an exemplary embodiment of the subject disclosure.

FIG. 15 illustrates management of the number of shots for each subject in personal authentication registration in an exemplary embodiment of the subject disclosure.

FIG. 16 illustrates management of the number of shots for each subject in object recognition registration in an exemplary embodiment of the subject disclosure.

FIG. 17 illustrates management of the number of shots for each scene in an exemplary embodiment of the subject disclosure.

FIGS. 19A and 19E illustrate computation of a search target angle for each scene in an exemplary embodiment of the subject disclosure.

DESCRIPTION OF THE EMBODIMENTS

Various exemplary embodiments, features, and aspects of the disclosure will be described in detail below with reference to the drawings. In the interest of accurate referencing, the exemplary enclosed embodiments will be referred to as first, second and third embodiments. The references in no way limit the disclosure provided herein, and are only provided as examples of the disclosure in practice.

<Camera Operation>

Figure 1A:
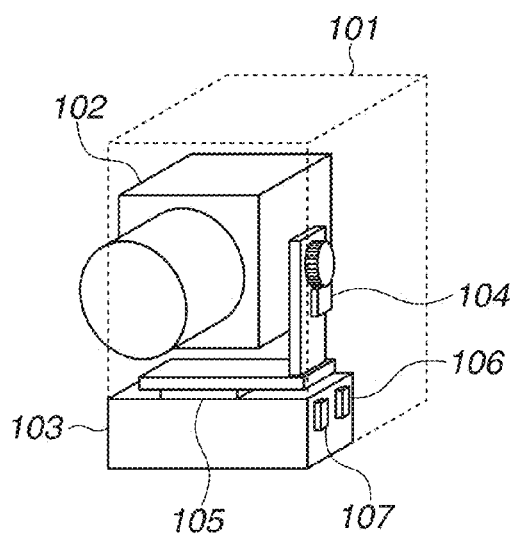
FIGS. 1A and 1B schematically illustrate an imaging apparatus according to an exemplary embodiment of the subject disclosure.
Figure 1B:
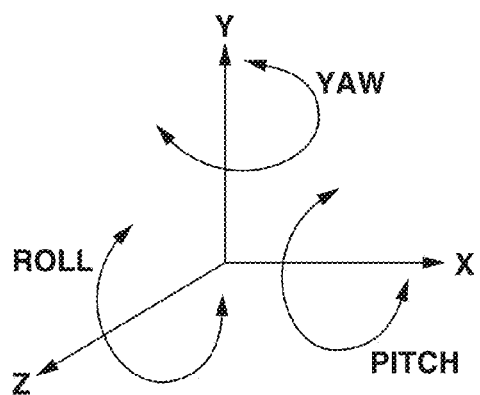

FIGS. 1A and 1B schematically illustrate a camera serving as an imaging apparatus according to a first exemplary embodiment.

The camera 101 illustrated in FIG. 1A is provided with, for example, an operation member for enabling a camera operation, such as a power switch.

A lens barrel 102, which includes photographic lens groups serving an imaging optical system and an image sensor used to perform image capturing, is attached to the camera 101, and the camera 101 is provided with mechanisms capable of performing rotary driving of the lens barrel 102 with respect to a fixed portion 103.

The camera 101 is provided with a motor drive mechanism (tilting rotation unit) 104 capable of rotating the lens barrel 102 in pitch directions illustrated in FIG. 1B and a motor drive mechanism (panning rotation unit) 105 capable of rotating the lens barrel 102 in yaw directions illustrated in FIG. 1B.

FIG. 1B illustrates definition of axes in the position of the fixed portion 103. Both an angular velocity meter 106 and an acceleration meter 107 are mounted on the fixed portion 103 of the camera 101.

<Block Diagram of Imaging Apparatus>

FIG. 2 is a block diagram illustrating a configuration of an imaging apparatus having an automatic subject search function according to the present exemplary embodiment.

Referring to FIG. 2, a zoom unit 201 includes a zoom lens which is used to perform optical variation of magnification. A zoom drive control unit 202 controls driving of the zoom unit 201.

A focus unit 203 includes a lens which is used to perform focus adjustment. A focus drive control unit 204 controls driving of the focus unit 203.

An imaging unit 205 includes the image sensor, which receives light incident through the lens groups and outputs information about electric charges corresponding to the amount of received light as analog image data to an image processing unit 206.

The image processing unit 206 applies image processing, such as distortion correction, white balance adjustment, and color interpolation processing, to digital image data output after analog-to-digital (A/D) conversion, and outputs the processed digital image data.

The digital image data output from the image processing unit 206 is converted into a recording format, such as Joint Photographic Experts Group (JPEG) format, and is then recorded by an image recording unit 207 on a recording medium such as a non-volatile memory.

A lens barrel rotary driving unit 213 drives a tilting rotation unit 104 and a panning rotation unit 105 to mechanically drive the lens barrel 102 in tilting directions and in panning directions, respectively.

An apparatus shake detection unit 208 is, for example, the acceleration meter (gyro sensor) 106, which detects angular velocities in triaxial directions of the imaging apparatus.

Moreover, the acceleration meter (acceleration sensor) 107, which detects accelerations in triaxial directions of the imaging apparatus, and the rotation angle of the apparatus or the amount of shifting of the apparatus is computed based on the detected signals.

An apparatus movement detection unit 209 detects movement of the apparatus using location information obtained by a global positioning system (GPS) system or using a movement detection unit such as an acceleration sensor.

The GPS can be provided on the body of the apparatus 101 or location information detected by an external GPS detection device can be transmitted to the apparatus 101 via communication.

While the amount of shifting of the apparatus is detected by the apparatus shake detection unit 208, since it is difficult to detect a large movement in view of characteristics of the acceleration sensor, a movement in a small range is detected by the apparatus shake detection unit 208 and a large movement is detected by the apparatus movement detection unit 209.

A speech input unit 210 acquires an audio signal from a microphone provided on the apparatus.

An operation unit 211 is used to operate the system and is provided with a power button and buttons for changing settings of the camera, and, when the power button is operated, power is supplied to the entire system depending on the intended use and the camera is activated.

A control unit 212 controls the entire system.

<Flowchart of Operation of Imaging Apparatus>

Figure 3:
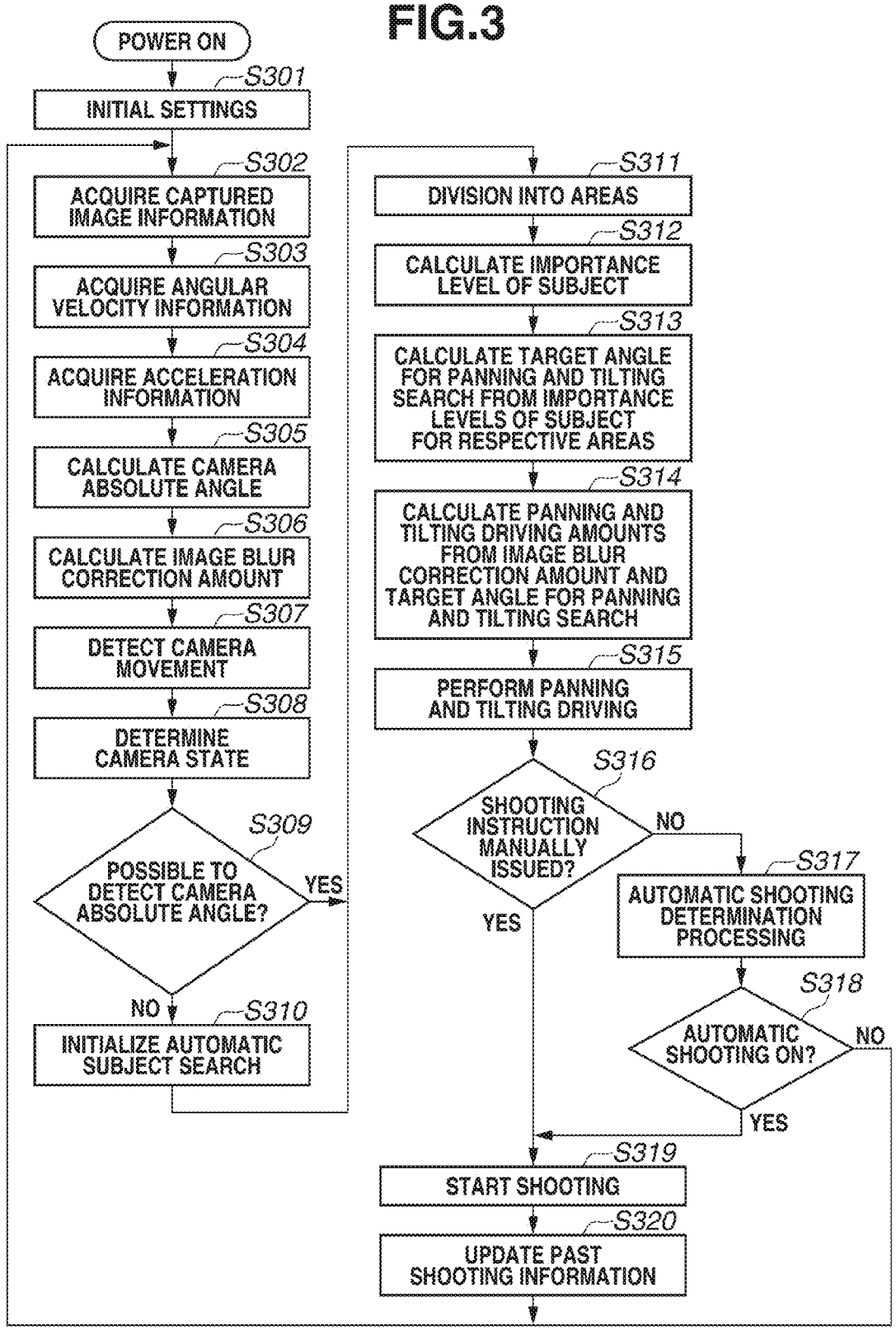
FIG. 3 is a flowchart illustrating control in an exemplary embodiment of the subject disclosure.

FIG. 3 is a flowchart illustrating an example of an operation of the imaging apparatus according to the present exemplary embodiment.

The imaging apparatus, which has an automatic subject search function illustrated in FIG. 3, is started by a main power supply of the camera 101 being turned on, so that automatic subject search or automatic shooting is performed.

When the power button is operated in the operation unit 211, first, in step S301, the control unit 212 performs various initial settings (for example, image capturing or automatic search).

In initialization of automatic search, for example, processing for initializing the importance level of a subject, which is described below, is performed.

When the initial settings are completed and the imaging apparatus becomes ready to acquire image information from the image sensor, the processing proceeds to step S302. In step S302, the control unit 212 causes the image processing unit 206 to generate an image subjected to image processing for subject detection from a signal acquired from the imaging unit 205.

Subject detection, such as person detection or object detection, is performed based on the generated image.

In the case of detecting a person, the face or human body of a subject is detected. In face detection processing, a pattern for determining the face of a person is previously defined, and a portion matching the pattern included in a captured image can be detected as a face image of the person.

Moreover, a reliability indicating the probability of the face of a subject is also concurrently calculated, and the reliability is calculated based on, for example, the size of the face region in an image or the degree of coincidence with the face pattern.

In the case of object recognition, similarly, an object matching a previously registered pattern can be recognized.

Furthermore, there is a method of extracting a characteristic subject by a method using a histogram of, for example, hues or saturations in a captured image.

With regard to an image of a subject captured in the shooting field angle, a distribution derived from a histogram of, for example, hues or saturations in the captured image is divided into a plurality of sections, and processing for classifying captured images for each section is performed.

For example, a histogram of a plurality of color components is generated with respect to a captured image, the image is sectioned with a mound-shaped distribution range, the captured images are classified with a region belonging to a combination of the same sections, and an image region of a subject is recognized.

An evaluation value is calculated for each recognized image region of a subject, so that an image region of the subject for which the evaluation value is highest can be determined as a main subject region.

The above-mentioned method can be used to obtain each piece of subject information from captured image information.

After the control unit 212 acquires captured image information such as subject detection information in step S302, the processing proceeds to step S303.

In step S303, the control unit 212 acquires angular velocity information output from the apparatus shake detection unit 208, and the processing, then proceeds to step S304.

In step S304, the control unit 212 acquires acceleration information output from the apparatus shake detection unit 208, and the processing then proceeds to step S305. In step S305, the control unit 212 calculates a camera absolute angle from the detected acceleration information and angular velocity information, and the processing then proceeds to step S306.

In step S306, the control unit 212 calculates an image blur correction amount used to reduce or prevent an image blur caused when the camera 101 is hand-held or attached to the human body in a wearable manner.

The method of calculating the camera absolute angle in step S305 and the method of calculating the image blur correction amount in step S306 are described with reference to a block diagram illustrated in FIG. 4 and explanatory diagrams illustrated in FIGS. 5A and 5B.

As illustrated in FIG. 1A, both the angular velocity meter 106 and the acceleration meter 107 are mounted on the fixed portion 103 of the camera 101.

Therefore, since information about the angular velocity and the acceleration at the position of the fixed portion 103 is output, the camera absolute angle calculated based on such information is also calculated as an absolute angle at the position of the fixed portion 103.

Furthermore, to correct a rotational shake of the lens barrel 102 (a shake of the image sensor), a correction angle amount is calculated based on the angular velocity information at the position of the fixed portion 103, so that an image blur correction amount is calculated.

Then, the tilting rotation unit 104 and the panning rotation unit 105 are driven based on the image blur correction amount, so that the lens barrel 102 can be rotated to perform blur correction.

<Block Diagram for Camera Absolute Angle Calculation and Image Blur Correction Amount Calculation>

Figure 4:
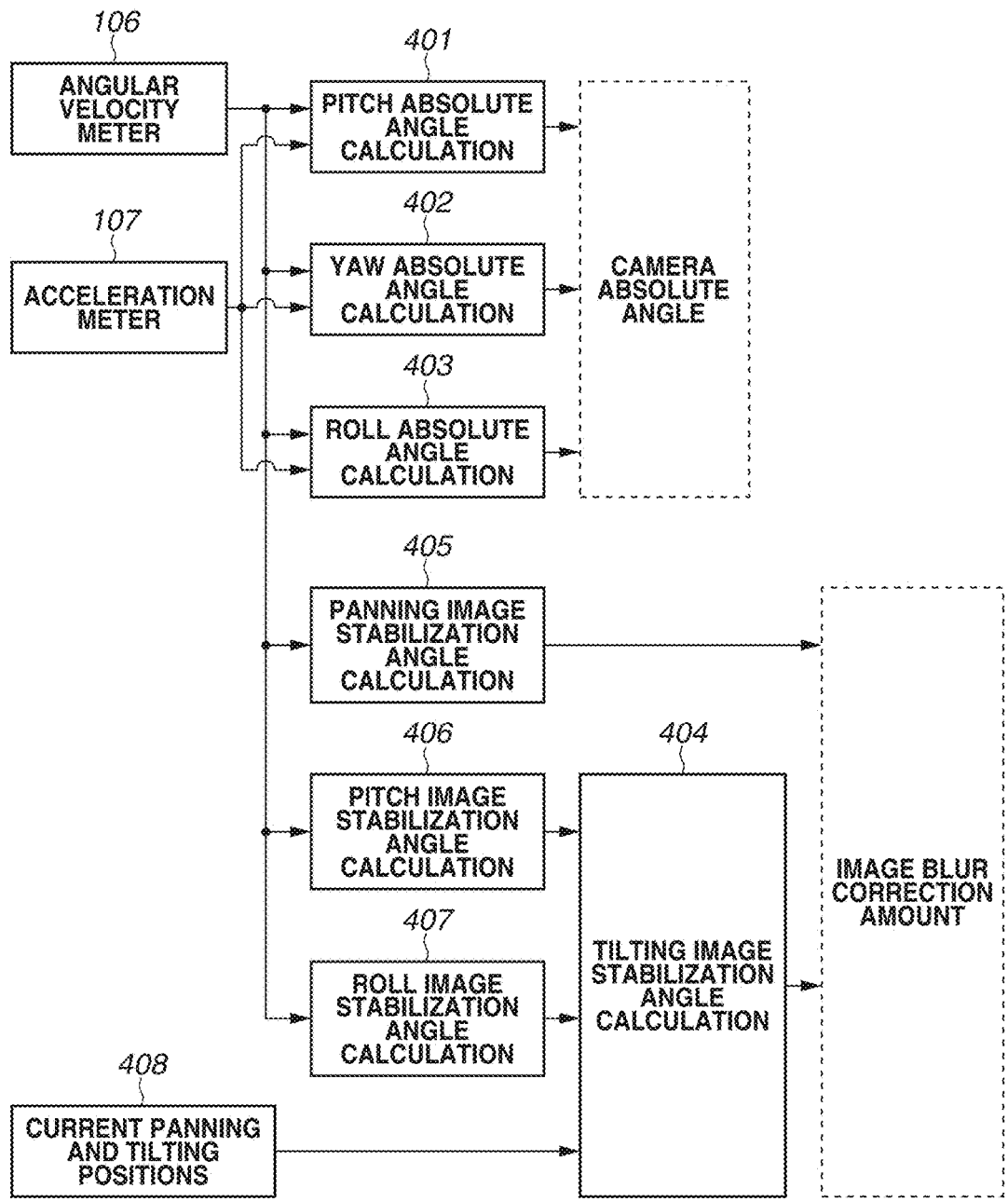
FIG. 4 is a functional block diagram for absolute angle calculation and image blur correction amount calculation in an exemplary embodiment of the subject disclosure.
Figure 5A:
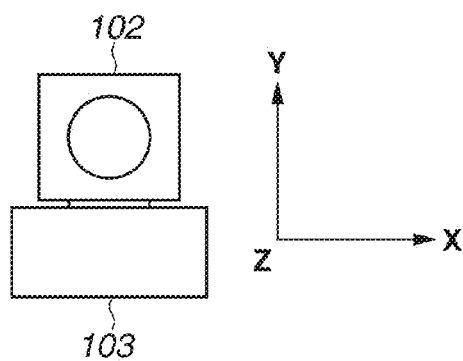
FIGS. 5A and 5B illustrate directions of the imaging apparatus in an exemplary embodiment of the subject disclosure.

FIG. 4 is a functional block diagram for camera absolute angle calculation and image blur correction amount calculation.

The method of calculating the camera absolute angle is described.

Outputs (pitch, yaw, and roll) of the angular velocity meter 106 and outputs (X axis, Y axis, and Z axis) of the acceleration meter 107 are input to a pitch absolute angle calculation unit 401, a yaw absolute angle calculation unit 402, and a roll absolute angle calculation unit 403, respectively.

Then, the respective absolute angles in the pitch direction, yaw direction, and roll direction are calculated, so that the absolute angle at the position of the angular velocity meter 106 and the acceleration meter 107, in other words, the camera absolute angle at the fixed portion 103, is calculated.

First, the camera absolute angles in the roll direction, pitch direction, and yaw direction can be calculated based on a relationship between outputs of the respective axes of the acceleration meter 107, so that an acceleration computation pitch absolute angle, an acceleration computation yaw absolute angle, and an acceleration computation roll absolute angle are calculated.

However, only when the apparatus remains still and is not affected by an acceleration from outside, in other words, only when an acceleration of gravity is dominant in the acceleration detected by the acceleration meter, the tilting angle can be accurately detected.

For example, consider a shooting operation performed by the operator holding the camera by the hands while walking, a shooting operation with the camera fixedly attached to a part of the human body, or a shooting operation with the camera attached to a vehicle such as a car or motorbike.

In that case, the influence of an acceleration other than the acceleration of gravity (herein referred to as a "vibration acceleration") becomes large, and it is difficult to perform accurate absolute angle computation.

Furthermore, in a case where the camera angle is estimated only by the angular velocity meter 106, the orientation and angle can also be estimated by integration calculation of angular velocity outputs, but, since errors due to integration are also accumulated, it is also difficult to perform accurate absolute angle computation.

Therefore, noise regions which are not appropriately dealt with by the angular velocity meter 106 and the acceleration meter 107 are removed, and sensor fusion is used to perform signal synthesis to calculate an absolute angle.

Sensor fusion is used to perform computation using, for example, a Kalman filter or a complementary filter, remove a low-frequency noise which has the greatest effect on integration errors of the angular velocity meter 106, and remove a high-frequency noise which has the greatest effect on computation errors caused by disturbances in the acceleration meter 107.

Then, combining the signals enables performing accurate absolute angle computation with noises removed.

Therefore, pitch absolute angle calculation 401 is performed based on sensor fusion of the gyro pitch angular velocity and the acceleration computation pitch absolute angle from the angular velocity meter 106, so that the pitch absolute angle is computed.

Moreover, yaw absolute angle calculation 402 is performed based on sensor fusion of the gyro yaw angular velocity and the acceleration computation yaw absolute angle from the angular velocity meter 106.

Then, the yaw absolute angle is computed, and roll absolute angle calculation 403 is performed based on sensor fusion of the gyro roll angular velocity and the acceleration computation roll absolute angle from the angular velocity meter 106, so that the roll absolute angle is computed.

Figure 5B:
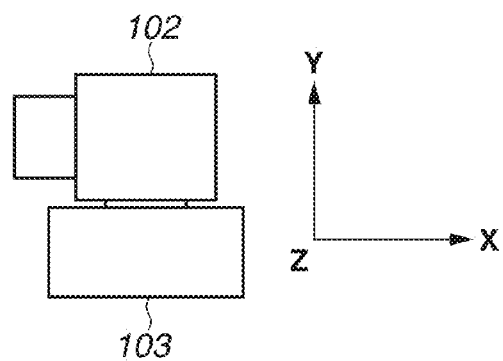

Furthermore, in an axis based on which the camera absolute angle is not detectable from the acceleration meter 107 (for example, the yaw rotation axis, which is the axis used for the rotation around the Y axis, in a case where the Y direction in FIG. 5B fully matches the direction of gravitational force), the absolute angle computation is performed only based on outputs from the angular velocity meter 106.

The last absolute angle obtained when the absolute angle is determined to be able to be calculated based on a change in camera angle is set as a start, and the absolute angle computation is performed based on angular velocity integration in a period in which the absolute angle is not detectable.

The camera absolute angle is able to be calculated according to the above method.

<Image Blur Correction Amount Calculation Method>

Next, an image blur correction amount calculation method is described.

Since the camera absolute angle is able to be calculated according to the above-described camera absolute angle calculation method, blur correction can be performed by performing rotary driving of the tilting rotation unit 104 and panning rotation unit 105 based on a signal indicating the camera absolute angle.

However, since, in a case where image stabilization control is performed based on the camera absolute angle, control to continue maintaining the same orientation is performed, such issues arise that the composition is not changed when the operator performs shooting while moving or image stabilization control performed by moving each unit beyond the movable end thereof becomes impossible.

Therefore, it is better to perform image stabilization control only on a high-frequency component without performing blur correction to a low-frequency component.

In image blur correction amount calculation, since blur correction control on a low-frequency component is not performed, the correction amount is calculated only using the angular velocity meter 106.

The output of the angular velocity meter 106 is integrated after the direct current (DC) component thereof is cut by a high-pass filter (HPF), and is then into an angular signal, so that an image stabilization angle is calculated.

The angular velocity meter 106 is mounted on the camera fixed portion 103, and the rotational axis in the yaw direction of the angular velocity meter 106 coincides with the rotational axis of the panning rotation unit 105.

Therefore, a panning image stabilization angle calculation unit 405 calculates an image stabilization angle in the panning direction (yaw direction) by performing angular conversion on the yaw angular velocity output from the angular velocity meter 106 using an HPF and integration, and blur correction in the panning direction is performed by performing mechanical rotary driving of the panning rotation unit 105.

With regard to the tilting direction, since the angular velocity meter 106 is mounted on the camera fixed portion 103, control to perform blur correction in the tilting direction varies depending on the rotation angle of the panning rotation unit 105.

The angular velocities in the axial directions defined as illustrated in FIG. 1B are assumed to be able to be detected at the position of the angular velocity meter 106, in other words, at the position of the camera fixed portion 103.

In a case where the panning rotation is in the normal position (FIG. 5A, when the X axis is located constantly in the direction perpendicular to the optical axis), a pitch image stabilization angle calculated by a pitch image stabilization angle calculation unit 406 is directly calculated as a tilting image stabilization angle.

In a case where the panning rotation angle is an angle rotated 90 degrees from the normal position (FIG. 5B, when the Z axis is located constantly in the direction perpendicular to the optical axis), a roll image stabilization angle calculated by a roll image stabilization angle calculation unit 407 is directly calculated as a tilting image stabilization angle.

Between the two cases, since a tilting image stabilization angle at the panning angle rotational position is calculated from the pitch image stabilization angle and the roll image stabilization angle based on the panning rotation angle, a tilting image stabilization angle corresponding to the panning angle rotational position can be calculated by the following formula (1).

$$\theta tl = \theta pi \times \cos \theta ap + \theta ri \times \sin \theta ap \quad (1)$$

(θtl: tilting image stabilization angle, θpi: pitch image stabilization angle, θri: roll image stabilization angle, and θap: panning image stabilization angle)

In this way, the tilting image stabilization angle is calculated by a tilting image stabilization angle calculation unit 404 according to the panning rotation position.

In formula (1), the tilting image stabilization angle is calculated by converting the pitch angle and the roll angle.

However, the tilting image stabilization angle can also be calculated by a method of calculating the tilting angular velocity from the pitch angular velocity and the roll angular velocity from the angular velocity meter 106 and the panning rotation angle and performing angular conversion on the tilting angular velocity using an HPF and integration processing.

In the above method, the panning image stabilization angle and the tilting image stabilization angle can be calculated, and blur correction can be performed by performing rotary driving of the tilting rotation unit 104 and the panning rotation unit 105 according to the respective image stabilization angles (image blur correction amounts).

Furthermore, the absolute angle of the lens barrel 102 can also be calculated from the above-obtained camera absolute angle and the rotational positions of the tilting rotation unit 104 and the panning rotation unit 105.

More specifically, an optical axis-based camera angle in the yaw direction (the yaw absolute angle of the lens barrel 102) can be calculated by subtracting the rotational angle of the panning rotation unit 105 from the yaw absolute angle output from the yaw absolute angle calculation unit. 402.

Moreover, the lens barrel rotational angle in the pitch direction and the lens barrel rotational angle in the roll direction which are converted into the position of the fixed portion 103 can be calculated from the rotational position of the panning rotation unit 105 and the rotational position of the tilting rotation unit 104.

Therefore, an optical axis-based camera angle in the pitch direction (the pitch absolute angle of the lens barrel 102) can be calculated by subtracting the lens barrel rotational angle in the pitch direction from the pitch absolute angle output from the pitch absolute angle calculation unit 401, and, then, an optical axis-based camera angle in the roll direction (the roll absolute angle of the lens barrel 102) can be calculated by subtracting the lens barrel rotational angle in the roll direction from the roll absolute angle output from the roll absolute angle calculation unit 403.

In this way, if the camera angle which is based on the optical axis can be calculated, it can be determined in which direction the lens barrel is currently pointing, based on the angle obtained when the camera is activated.

When the camera absolute angle and the image blur correction amount are calculated according to the above-described method, the processing proceeds to step S307, in which camera movement detection is performed.

The control unit 212 detects whether the camera 101 has moved to a great extent, based on the GPS positional information or acceleration information input from the apparatus movement detection unit 209.

Alternatively, in a configuration which has an external device capable of acquiring GPS positional information and in which the camera 101 and the external device are able to communicate with each other, the control unit 212 can detect whether the camera 101 has moved, by receiving movement information transmitted from the external device to the camera 101 when the GPS positional information has varied.

In step S308, the control unit 212 performs camera state determination.

The control unit 212 determines in what kind of vibration or movement state the camera is currently, based on the camera angle or camera movement amount detected from the angular velocity information, acceleration information, or GPS positional information.

For example, in a case where shooting is performed with the camera 101 mounted on a car, subject information such as the surrounding landscape varies to a great extent according to the movement distance.

Therefore, the control unit 212 can determine whether the camera is in a "vehicle movement state", in which the camera is moving at high speed while being mounted on, for example, a car, and can use the detected information for automatic subject search, which is described below.

Furthermore, the control unit 212 determines whether a change in the camera angle is large, and determines whether the camera 101 is in a "placement shooting state", which has little angle of shake. Since, in a case where the camera 101 is in the "placement shooting state", it can be considered that there is no change in angle of the camera 101 itself, the control unit 212 can perform subject search for placement shooting.

Moreover, in a case where a change in camera angle is relatively large, since it is determined that the camera 101 is in a "hand-held state", the control unit 212 can perform subject search for hand-held shooting.

The subject search method in each state is described below.

In step S309, the control unit 212 determines whether the camera angle detected in step S305 is the accurately calculated one, and, in a case where it is hard to detect the camera absolute angle, the control unit 212 determines that it is impossible to detect the camera absolute angle.

Then (NO in step S309), the processing proceeds to step S310. In step S310, the control unit 212 initializes automatic search processing, including processing such as initialization of the importance level of a subject, which is described below.

If it is possible to detect the camera absolute angle (YES in step S309), the processing proceeds to step S311.

The state in which it is impossible to detect the camera absolute angle is a case where an impact to the camera is very large and the calculation of the camera angle from the acceleration meter output is failed.

Moreover, if the state such as described above is detected, for example, in a case where the camera angular velocity is very large and the range detectable by the angular velocity meter is exceeded, it is determined that it is impossible to detect the camera absolute angle.

In step S311, the control unit 212 performs division into areas based on the absolute angle of the camera 101 obtained at the time of initial setting in step S301 or at the time of initialization of automatic subject search in step S310.

Then, the control unit 212 performs division into blocks on an image currently acquired by the camera 101 based on the division into areas.

<Method for Division into Areas>

The division into areas is described with reference to FIGS. 6A, 6B, 6C, and 6D.

Figure 6A:
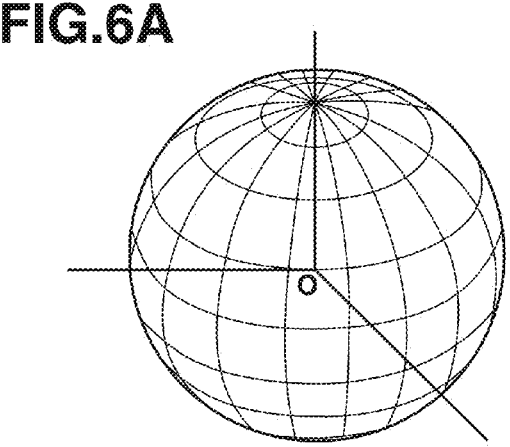
FIGS. 6A, 6B, 6C, and 6D illustrate division into areas for respective angle regions in space coordinates of the imaging apparatus according to an exemplary embodiment of the subject disclosure.

Division into areas is performed on the entire spherical surface with the camera position used as the origin (the origin O being set as the camera position) as illustrated in FIG. 6A.

In the example illustrated in FIG. 6A, division is performed with 22.5 degrees in each of the tilting direction and the panning direction.

When division is performed as illustrated in FIG. 6A, as the angle in the camera tilting direction moves away from 0 degrees, the circumference in the horizontal direction becomes smaller, so that the coverage of each area becomes smaller.

Figure 6B:
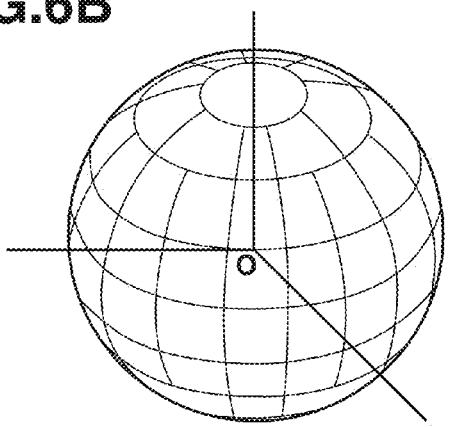

Therefore, as illustrated in FIG. 6B, in a case where the tilting angle is 45 degrees or more, the area range in the horizontal direction is set larger than 22.5 degrees.

Figure 6C:
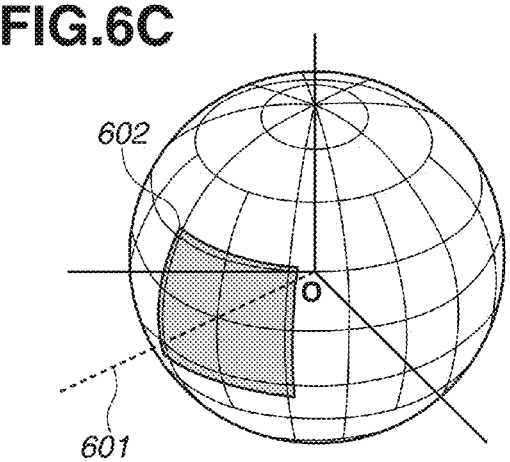
Figure 6D:
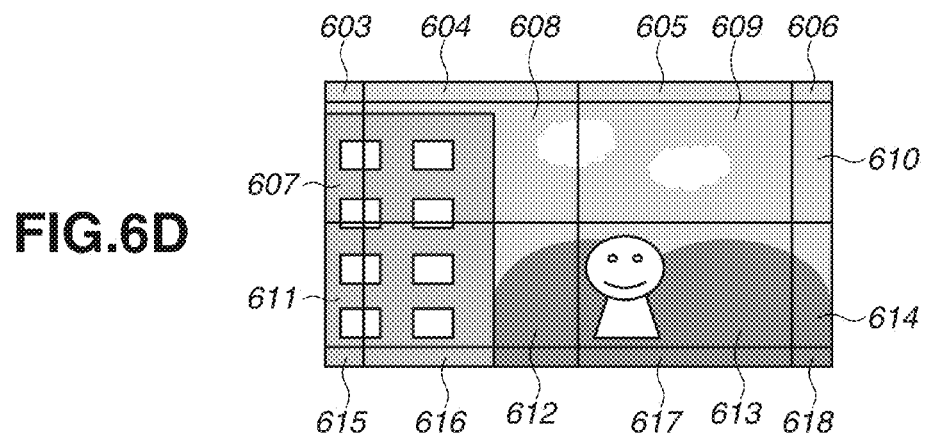

FIGS. 6C and 6D illustrate an example in which division into areas is performed within a shooting field angle.

An axis 601 indicates the direction of the camera 101 at the time of initialization, and division into areas is performed with this direction angle used as the reference position.

An area 602 represents a field angle area of a captured image, and an example of the image captured at that time is illustrated in FIG. 6D. The image captured in the field angle is divided into image sections 603 to 618 illustrated in FIG. 6D based on the division into areas.

<Division into Areas in Shooting Field Angle>

Figure 7A:
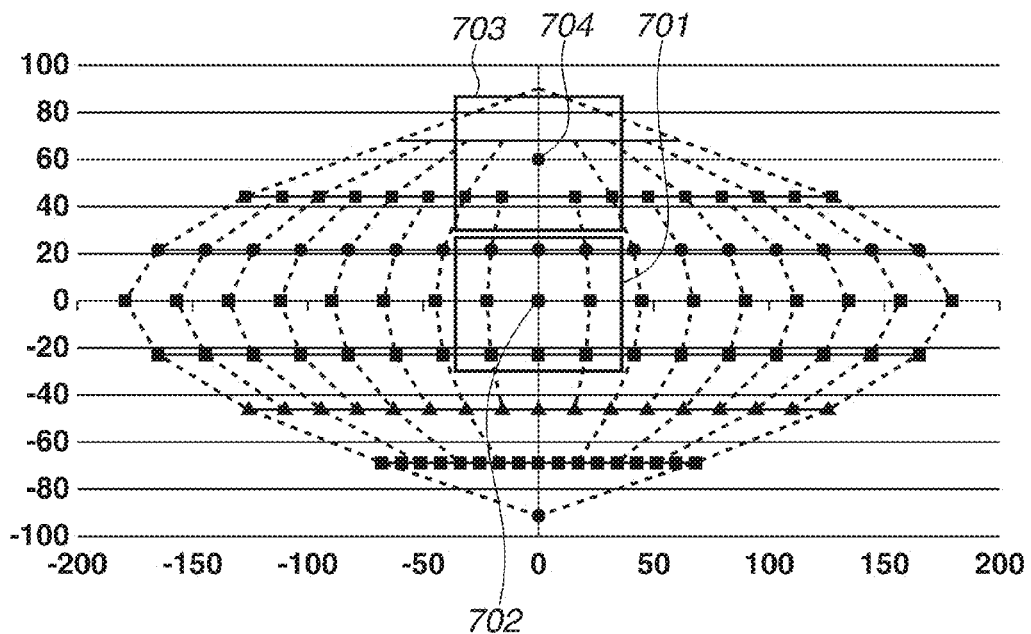
FIGS. 7A, 7B, and 7C illustrate divisions into areas in a captured image in an exemplary embodiment of the subject disclosure.
Figure 7B:
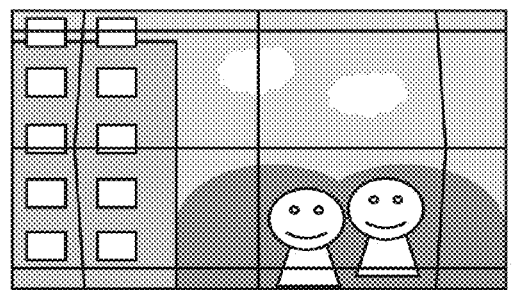
Figure 7C:
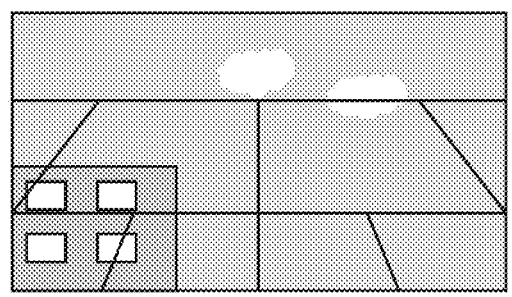

FIGS. 7A, 7B, and 7C illustrate division into areas in the shooting field angle when the panning direction of the camera is set to the direction 601 obtained at the time of initialization.

The area coverage which is based on the absolute angle of the camera 101 at the time of initialization of automatic subject search and which is obtained when the tilting angle is 0 degrees has a camera shooting field angle 701 and a field angle center 702, and the captured image obtained at that time is illustrated in FIG. 7B.

The area coverage which is obtained when the tilting angle is 55 degrees has a camera shooting field angle 703 and a field angle center 704, and the captured image obtained at that time is illustrated in FIG. 7C.

While, in a case where the tilting angle is 0 degrees, since the angular range in the horizontal direction is not so greatly different, a difference in size between areas is small, in a case where the tilting angle is 55 degrees, the angular range in the horizontal direction greatly varies depending on the angles.

Therefore, in a case where the tilting angle is 45 degrees or more, the area range in the horizontal direction is set larger than 22.5 degrees, so that the area range is prevented from becoming too smaller as the tilting angle becomes larger.

Figure 8A:
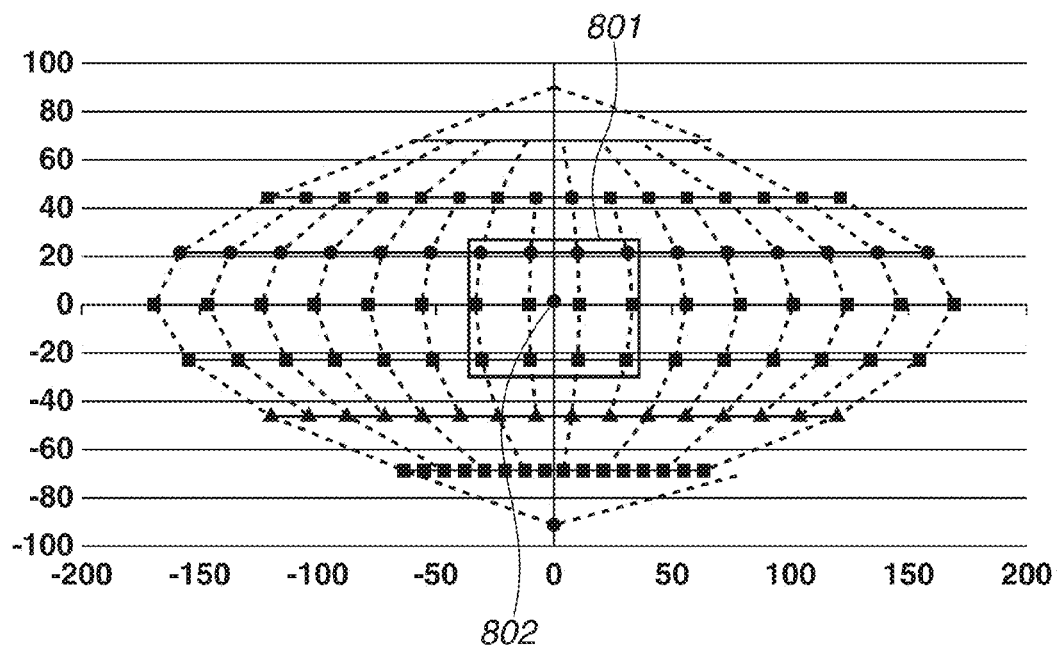
FIGS. 8A and 8B illustrate divisions into areas in a captured image in an exemplary embodiment of the subject disclosure.
Figure 8B:
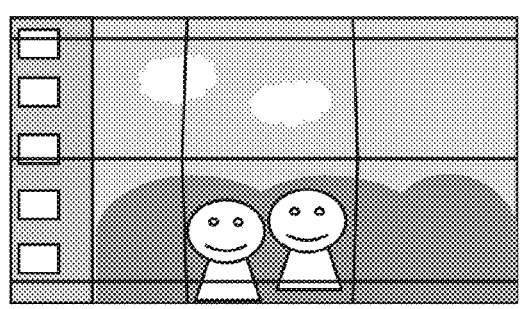

FIGS. 8A and 8B illustrate the area coverage obtained when the camera has been rotated 11.25 degrees in the panning direction from the camera initial position and when the tilting angle is 0 degrees, which has a camera shooting field angle 801 and a field angle center 802, and the captured image obtained at that time is illustrated in FIG. 8B.

As illustrated in FIG. 8A, the area coverage is set with 11.25 degrees as the center in the horizontal direction.

The range of a divisional area in the above shooting field angle is obtained by the following formulae (2) and (3), and all of the ranges of divisional areas present in the field angle are calculated, so that division into areas is performed in the image as illustrated in FIG. 7B or 7C or FIG. 8B.

$$\theta ay = \theta y + \theta y' \quad (2)$$

$$\theta ax = \theta x' \times \cos \theta ay \quad (3)$$

where $\theta x$: the panning angle (based on the camera initial position),
$\theta y$: the tilting angle (based on the camera initial position),
$\theta x'$: the angle from the panning angle position (the center in the horizontal direction of the image) to the angle of a divisional area,
$\theta y'$: the angle from the tilting angle position (the center in the vertical direction of the image) to the angle of a divisional area,
$\theta ax$: the length of the horizontal direction angle from the horizontal center in the image to the angle of a divisional are in the horizontal direction,
$\theta ay$: the length of the vertical direction angle from the vertical center in the image to the angle of a divisional are in the vertical direction, and
the camera initial position is based on 0 degrees.

While each area division angle is set to 22.5 degrees, the horizontal area division angle in the range of 45 degrees to 67.5 degrees in the vertical direction is set to 45 degrees. In the range of 67.5 degrees to 90 degrees in the vertical direction, division in the horizontal direction is not performed, so that only one area is set.

In this way, after division into areas is performed in step S311, the processing proceeds to step S312, in which the control unit 212 calculates the importance level of a subject.

In the following description, the importance level of a subject is calculated for each area based on, for example, subject information in the acquired image such as that illustrated in FIG. 6D.

With respect to an area in which a captured region is small relative to the field angle, such as areas 603, 604, 605, 606, 607, 610, 611, 614, 615, 616, 617, and 618 illustrated in FIG. 6D, the importance level of a subject is not determined or updated.

For example, when the size of an area is assumed to be 100%, in a case where a captured image region in the area is 50% or less, the importance level of a subject is not determined or updated.

In each of the above set areas, the importance level of a subject is set under various conditions. The importance level of a subject is calculated from, for example, the following items.

In the present exemplary embodiment, a changing unit which changes the center position of the field angle of a captured image based on the importance level of a subject calculated for each area is used to change the center position of the field angle of a captured image in which to search for a subject.

<Setting of Importance Level Corresponding to Person Information>

The importance level corresponding to person information in each area position in the field angle is set.

Known techniques for face detection include, for example, a method of using knowledge about a face (skin color information and parts such as an eye, nose, and mouth) and a method of configuring a discriminator for face detection with a learning algorithm typified by neural networks.

Furthermore, usually, to improve detection accuracy, a plurality of face detection methods is combined to be used for face detection.

Face detection is performed to calculate, for example, the size of a face, the orientation of a face, and the reliability indicative of a probability of a face.

Furthermore, there is known a technique of detecting a facial expression from information about the detected organs of the face, so that the degree of opening of the eyes can be detected or the degree of smile can be detected.

More specifically, a feature amount required for detecting a facial expression is acquired from, for example, profiles of the organs configuring a face (for example, the eye, nose, and mouth) and positions of the inner corner of the eye, the outer corner of the eye, the nostril, the corner of the mouth, and the lips.

The method of acquiring the feature amount includes, for example, a method of performing template matching using templates of face constituent parts and a method of performing a learning algorithm using a great number of sample images of face constituent parts.

For example, the degree of smile, closing of the eyes, wink, and facial expression estimation (delight, surprise, anger, sadness, and straight face) can be detected based on the detected feature amount.

Furthermore, individual face data can be previously registered, and personal face authentication for further detecting whether the person is a specific individual person based on the detected face can also be performed.

It is determined whether the detected object matches an object previously registered in a database, or the degree of matching is determined.

Image data of the detected subject is used to extract feature information for identifying the region of the subject as an object to be authenticated. Then, the extracted feature information is compared with feature information which is registration information about images of subjects previously registered in a database.

An authentication evaluation value indicating the degree of similarity obtained by the comparison is used to perform authentication to determine which object the object to be authenticated is or to determine whether there is no matching registration object.

For example, a predetermined threshold value is provided with respect to the authentication evaluation value, and, when the authentication evaluation value is equal to or greater than the predetermined threshold value, it can be determined that the object to be authenticated is the corresponding object registered in the database.

A gain Kr is a value indicating the level of face reliability (for example, as the reliability increases from a low level to a large level, the gain Kr increases), and the reliability is determined based on, for example, the size of a face, the orientation of a face, and the probability of a face.

A gain Ka is a value indicating the level of individual face authentication information, and is set for each face based on the degree of importance for each registered individual face (for example, the degree of importance being previously registered) or past shooting information, which is described below.

A gain Ks is a value indicating the level of facial expression, and is expressed by a level for each face based on the levels corresponding to previously set facial expressions (for example, smile, delight, and surprise are set to high levels, and anger, sadness, straight face, and closing of the eyes are set to low levels).

Here, the level of each facial expression can be configured to vary according to the degree of facial expression, for example, in the case of smile, the degree of smile.

According to the above obtained gains Kr, Ka, and Ks, a level Flvl corresponding to a person facial expression is obtained by the following formula (4).

$$Flvl = Kr \times Ka \times Ks \quad (4)$$

Figure 9:
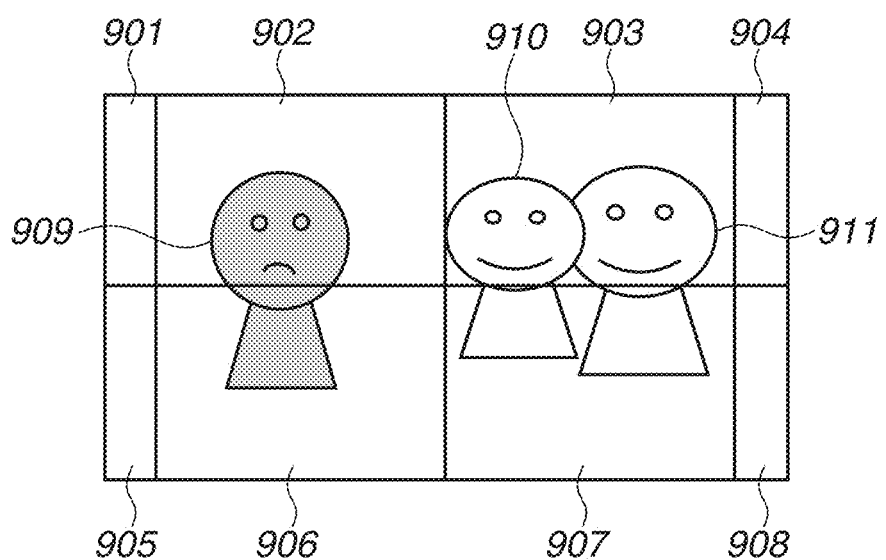
FIG. 9 illustrates person detection in each area in a captured image in an exemplary embodiment of the subject disclosure.

Level setting corresponding to person information is described with reference to FIG. 9.

As mentioned above, an area in which a captured region in the image is small, such as areas 901, 904, 905, and 908, is not deemed to be an area to be searched and is thus not subjected to determination.

Here, a case in which images of three persons (909, 910, and 911) are captured in the field angle is described as an example. The subject 909 is assumed to be a subject which is not registered with individual face authentication (registration information) and to be a subject without a smile on the facial expression. The subject 910 is assumed to be a subject which is not registered with individual face authentication and to be a subject with a smile on the facial expression.

The subject 911 is assumed to be a subject which is registered with individual face authentication and to be a subject with a smile on the facial expression.

Since an image of the person 909 is captured in the areas 902 and 906, level setting is performed on both the areas 902 and 906 according to person information about the person 909.

Since the person 909 is not registered with individual face authentication, the gain Ka is "1", and, since the person 909 does not have a smile, the gain Ks is "1", so that the importance level of the subject (person) 909 is determined according to the gain Kr indicating the level of face reliability of the person 909.

Since images of the persons 910 and 911 are captured in the areas 903 and 907, level setting is performed on both the areas 903 and 907 according to person information about the persons 910 and 911.

Since the person 910 is not registered with individual face authentication, the gain Ka is "1", and, since the person 910 is a subject having a smile, the gain Ks is set to a value greater than "1".

Since the person 911 is registered with individual face authentication, the gain Ka is a value greater than "1", and, since the person 911 is a subject having a smile, the gain Ks is set to a value greater than "1".

Accordingly, in a case where the levels of face reliability of the person 909, 910, and 911 are the same degree of reliability, the magnitudes of the importance levels of subjects become 911>910>909.

Furthermore, level setting is performed according to a rate at which an image of the face is captured in an area. In an area in which the rate of the face image is large, the above obtained level is directly set, and, in an area in which the rate of the face image is small, the level is changed according to the rate of the face image.

For example, in a case where the rates of the face image in the area 903 and the area 907 are 8:2, the levels thereof are set as 10:2.5, respectively.

In the above-described way, the person level is set for each area based on the person information.

<Setting of Importance Level Corresponding to Object Recognition Information>

If a previously registered subject is detected, setting of the importance level which is based on object recognition information is performed.

For example, setting of the importance level using subject recognition is performed based on a general object category recognition for "dog", "cat", or the like or the degree of matching with a previously registered subject image.

Object recognition includes, for example, a method of configuring discriminators for "dog", "cat", or the like according to a learning algorithm typified by neural networks.

Figure 10:
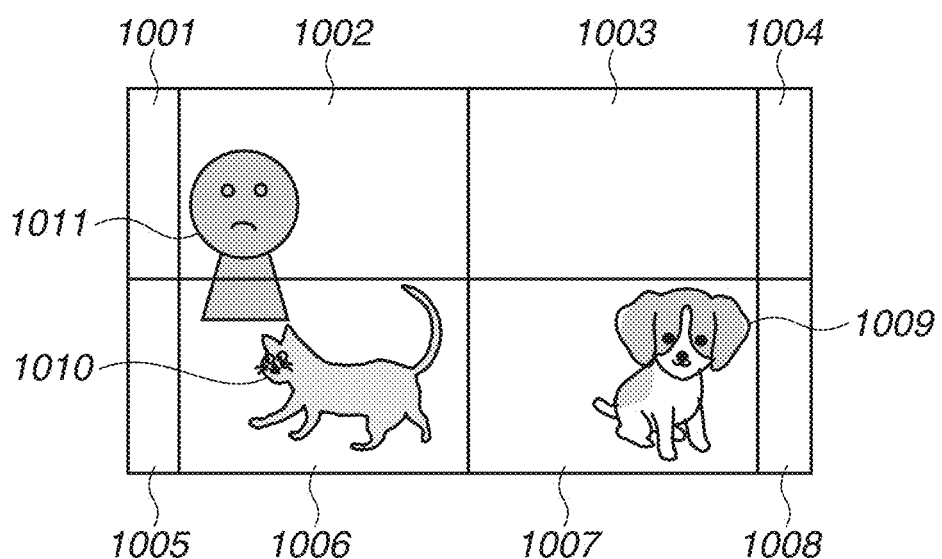
FIG. 10 illustrates object detection in each area in a captured image in an exemplary embodiment of the subject disclosure.

Level setting corresponding to previously registered object recognition information is described with reference to FIG. 10. Here, a case in which images of three subjects (1009, 1010, and 1011) captured in the field angle are present on the screen is described as an example.

The subject 1009 is determined to be a dog by object recognition, and the subject 1010 is determined to be a cat. The subject 1011 is a person, and, since a person is determined in advance in the <Setting of Importance Level Corresponding to Person information>, the person is a subject excluded from targets of level setting corresponding to object recognition information.

The level obtained when a "dog" is recognized and the level obtained when a "cat" is recognized are previously registered, and, for example, a dog is an important subject. In a case where a "cat" is defined as not being an important subject, the level of an area 1007 in which a "dog" is detected is set higher than the level of an area 1006 in which a "cat" is detected.

Furthermore, the reliability of object recognition can be obtained and the level can be changed according to the detected reliability.

Here, level setting is also performed according to a rate at which an image of the subject is captured in an area. In an area in which the rate of the subject image is large, the above obtained importance level is directly set, and, in an area in which the rate of the subject image is small, the importance level is changed according to the rate of the subject image.

<Setting of Importance Level Corresponding to Shooting Scene>

Determination of, for example, a "blue sky scene", a "natural verdure scene", and an "evening view scene" is performed by analyzing image data, and level setting is performed based an such scene determination information.

Furthermore, with regard to scene determination concerning the sky, since information about the tilt of the camera can be obtained from the absolute angle information of the camera, determination about the sky, such as a "blue sky scene" and an "evening view scene", is performed in an image present in a region upper than the direction perpendicular to the direction of gravitational force.

First, 12-bit RAW data of a captured one frame is divided into blocks including n×m (n and m being integers) regions, and average values of pixels of respective colors R, G, and B in each divided region are calculated. Temporary development processing including white balance correction processing, gamma correction processing, and color conversion matrix processing is performed on the R, G, and B average values of each block.

Determination of a "blue sky scene" is performed by calculating the rate of blue-sky blocks in an upper region in the screen. Determination of a blue-sky block is performed by defining a blue-sky determination region on the UV color space and counting blocks falling into the blue-sky determination region.

Determination of an "evening view scene" is performed by calculating the rate of evening-view blocks in an upper region in the screen.

Determination of an evening-view block is performed by defining an evening-view determination region on the UV color space and counting blocks falling into the evening-view determination region.

Determination of a "natural verdure scene" is performed by detecting the rate of natural-verdure blocks to all of the blocks in the screen.

Determination of a natural-verdure block is performed by defining a natural-verdure determination region on the UV color space and counting blocks falling into the natural-verdure determination region.

Figure 11:
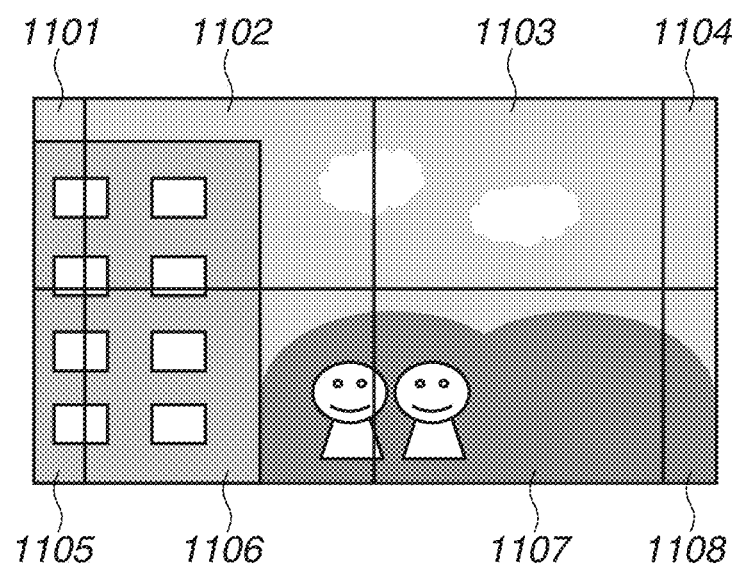
FIG. 11 illustrates scene detection in each area in a captured image in an exemplary embodiment of the subject disclosure.

Setting of the importance level corresponding to scene detection information is described with reference to FIG. 11.

The scene is assumed to show a blue say in an upper right range of the screen, a building in a left range of the screen, and a natural verdure in a lower right range of the screen.

A "blue sky scene" and a "natural verdure scene" are detected by performing scene determination in the screen, and the level corresponding to the blue sky region recognition is set in an area 1103 and the level corresponding to the natural verdure region recognition is set in an area 1107.

With respect to an area 1102, since the rate of blue-sky blocks to the area is about 40%, 40% of the level corresponding to the blue sky region recognition is set. With respect to an area 1106, since the rate of natural-verdure blocks to the area is about 30%, 30% of the level corresponding to the natural verdure region recognition is set.

While the scene determination method using color space information has been described above, there is also a method of determining a scene based on a luminance value, which is described with determination of a "night view scene" taken as an example.

In the "night view scene", a case in which only levels extremely high in luminance and levels extremely low in luminance as luminance information are distributed in a histogram of the entire screen is determined to correspond to a night view.

Furthermore, a point light source can be determined using contrast evaluation based on high-frequency components of a luminance signal of an image, and a "night view scene" can be determined using a luminance distribution and a result of detection of the point light source.

The respective importance levels in a "blue sky scene", an "evening view scene", a "natural verdure scene", and a "night view scene" are previously registered, and setting of the importance level corresponding to a scene is performed for each area according to an associated one of the registered importance levels.

In the above-described way, the importance level of a subject is calculated for each area using a result of detection by a scene detection unit which detects a scene using color information about a subject or luminance information about the subject.

<Setting of Importance level Corresponding to Speech Information>

Determination of, for example, a "speech direction" a "sound level (speech level)", and a "speech recognition" is performed by analyzing speech information data, and setting of the importance level which is based on speech information is performed.

Figure 12:
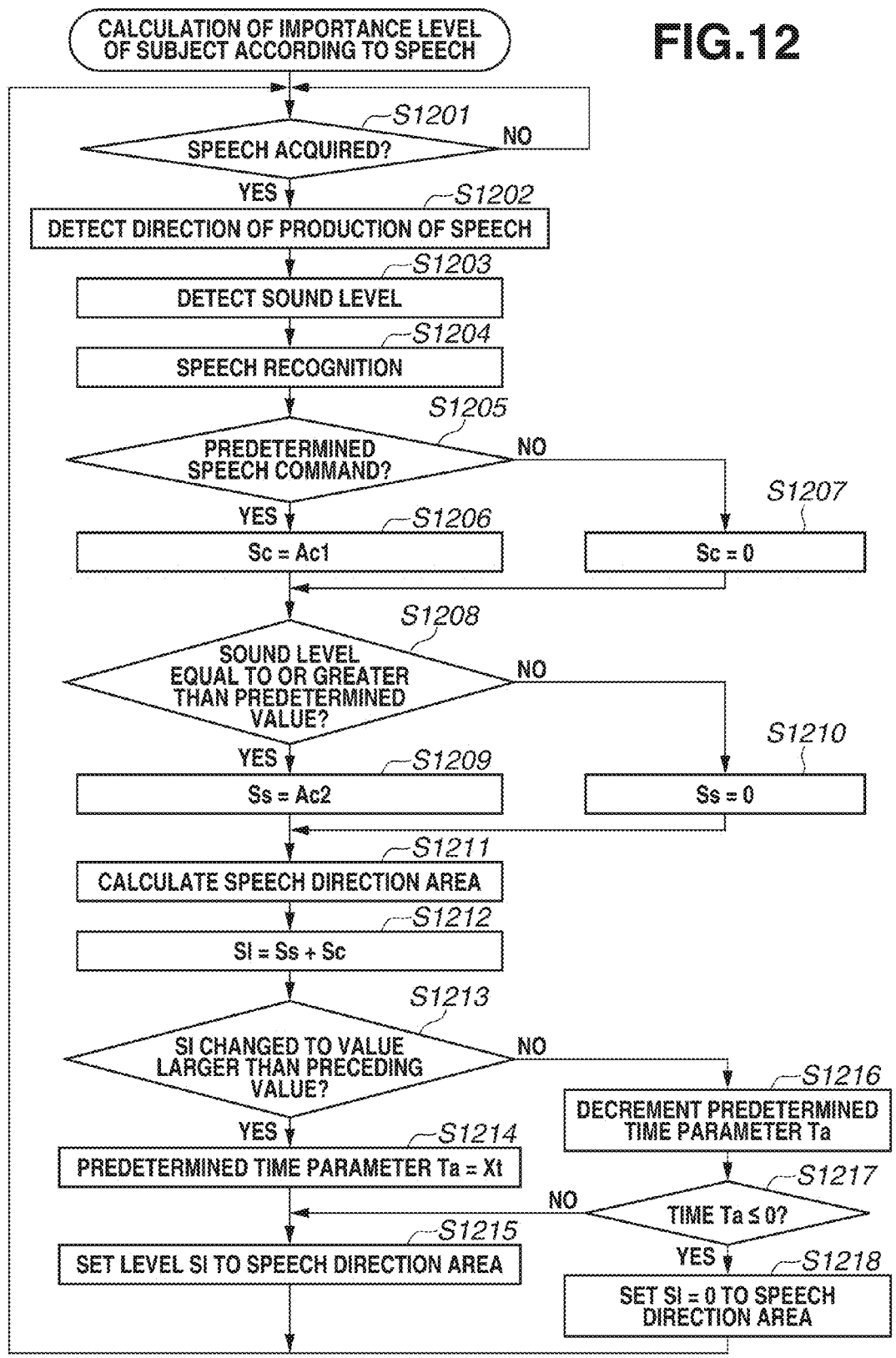
FIG. 12 is a flowchart illustrating speech detection in an exemplary embodiment of the subject disclosure.

Setting of the importance level corresponding to speech information is described with reference to the flowchart of FIG. 12.

In step S1201, the control unit 212 determines whether a speech acquisition unit has acquired a speech produced by the outside. If it is determined that the speech acquisition unit has acquired the speech (YES in step S1201), the processing proceeds to step S1202. If it is determined that the speech acquisition unit has not acquired the speech (NO in step S1201), the processing returns to step S1201.

In step S1202, the control unit 212 causes a speech direction detection unit to detect a direction of production of the acquired speech. In step S1203, the control unit 212 detects a sound level.

In step S1204, the control unit 212 causes a speech recognition unit to recognize the acquired speech. In step S1205, the control unit 212 causes the speech recognition unit to determine the acquired speech is a predetermined speech command to be used for speech recognition. If it is determined that the acquired speech is the predetermined speech command (YES in step S1205), the processing proceeds to step S1206, in which the control unit 212 sets a speech recognition level Sc to "Ac1".

If it is determined that the acquired speech is not the predetermined speech command (NO in step S1205), the processing proceeds to step S1207, in which the control unit 212 sets the speech recognition level Sc to "0". Next, in step S1208, the control unit 212 determines whether the detected sound level is equal to or greater than a predetermined value, and, if it is determined that the detected sound level is equal to or greater than the predetermined value (YES in step S1208), the processing proceeds to step S1209, in which the control unit 212 sets a sound level Ss to "Ac2".

If it is determined that the detected sound level is less than the predetermined value (NO in step S1208), the processing proceeds to step S1210, in which the control unit 212 sets the sound level Ss to "0". Then, the processing proceeds to step S1211, in which the control unit 212 calculates a sound direction area corresponding to areas defined as illustrated in FIGS. 6A to 6D from the sound direction detected in step S1202.

For example, in view of a sound direction recognition error, the control unit 212 determines all of the range of ±45 degrees from the angle of the detected direction as the sound direction area.

Next, in step S1212, the control unit 212 adds together the speech recognition level Sc and the sound level Ss to calculate a total sound level Sl, and the processing proceeds to step S1213.

In step S1213, the control unit 212 determines whether the total sound level Sl has changed to a value larger than the total sound level Sl obtained at the preceding sampling.

If it is determined that the total sound level has changed to a larger value (YES in step S1213), the processing proceeds to step S1214, in which the control unit 212 sets a time count Xt to a predetermined time parameter Ta, and the processing then proceeds to step S1215.

In step S1215, the control unit 212 sets the level Sl to the area set in step S1211, and the processing then returns to step S1201.

If, in step S1213, it is determined that the total sound level Sl has changed to a value smaller than the total sound level Sl obtained at the preceding sampling (NO in step S1213), the processing proceeds to step S1216, in which the control unit 212 decrements the predetermined time parameter Ta, and the processing then proceeds to step S1217.

In step S1217, the control unit 212 determines whether the time Ta is equal to or less than "0", and, if it is determined that the time Ta is equal to or less than "0" (in a case where the time Ta has elapsed after the level Sl has changed to a larger value) (YES in step S1217), then in step S1218, the control unit 212 sets the level Sl to "0", thus setting the area set in step S1211 to "0".

If, in step S1217, it is determined that the time Ta is greater than "0" (NO in step S1217), the processing proceeds to step S1215, the control unit 212 sets the level Sl calculated up to this point as the importance level corresponding to the speech information to the area in the speech direction.

<Setting of Importance Level Corresponding to Image Motion Information>

Setting of the importance level corresponding to image motion information is performed by determining whether a motion subject is present in each area obtained by division into areas performed as illustrated in FIGS. 6A to 6D.

For example, detection of a difference between frames or detection of a motion vector between frames is performed for each area.

The method of detecting a motion vector includes dividing a screen into a plurality of regions, comparing a previously stored image for the preceding frame and a current image (two successive images) with each other, and calculating an image motion amount based on information about the amount of relative shifting of images.

Here, since the angle of the lens barrel (in the direction of the optical axis of the imaging plane) can be obtained from differences between the camera absolute angle and the rotational positions output from the tilting rotation unit 104 and the panning rotation unit 105, a motion vector value of image blur affected by a change in camera angle can be detected from a difference in the lens barrel angle between frames.

Figure 13A:
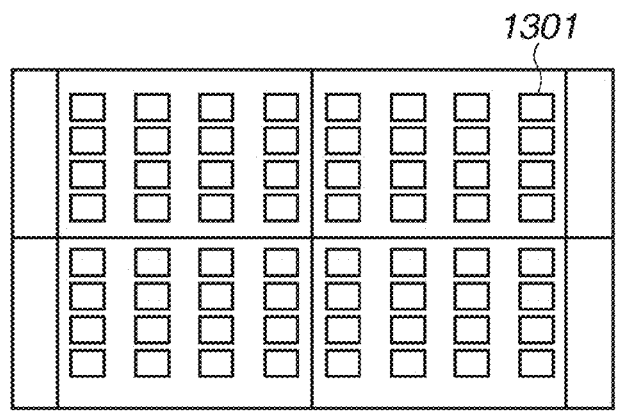
FIGS. 13A, 13B, and 13C illustrate motion detection in a captured image in an exemplary embodiment of the subject disclosure.

Movement pixels between frames are detected in regions 1301 obtained by further dividing each area as illustrated in FIG. 13A, and frequency distribution processing is performed based on vector signals obtained by subtracting the motion vector value affected by a change in camera angle from the detected movement pixels.

Furthermore, in a case where it is difficult to detect vectors, such as in the case of low contrast, vector information in a block in which detection of vectors is impossible is not reflected in the frequency distribution processing.

Figure 13B:
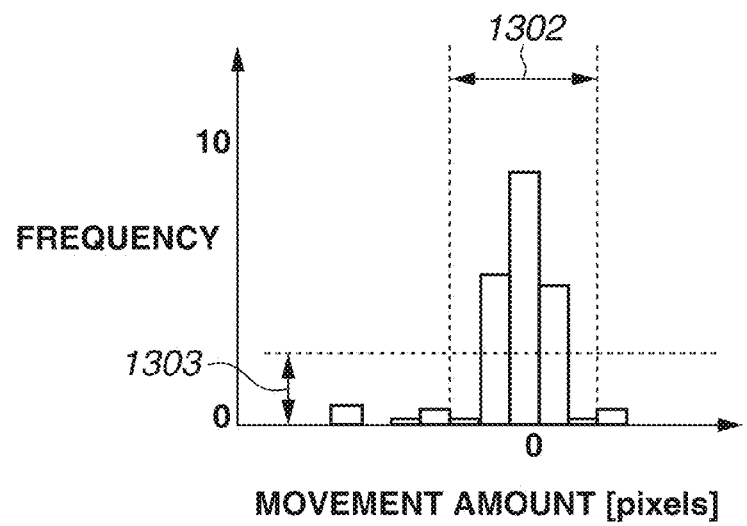
Figure 13C:
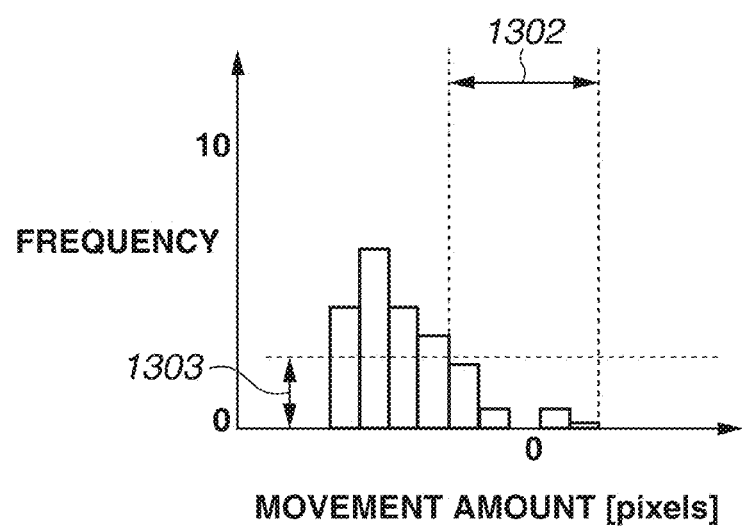

Frequency distribution examples are illustrated in FIGS. 13B and 13C. FIG. 13B illustrates a frequency distribution example in a certain frame in a case where no motion subject is present in a certain area.

Since the range of a threshold value 1302 is a vector range in which vector values are small and there are little motions, vector information obtained in the range of the threshold value 1302 is not used.

While, in a case where movement amounts other than the threshold value 1302 exceed a frequency threshold value 1303, it is determined that a motion subject is present in the area, since, in the case of FIG. 13B, the movement amounts other than the threshold value 1302 do not exceed the frequency threshold value 1303, it is determined that no motion subject is present in the area.

FIG. 13C illustrates a frequency distribution example in a certain frame in a case where a motion subject is present in an area. Since vector movement amounts outside the range of the threshold value 1302 exceed the frequency threshold value 1303, it is determined that a motion subject is present in the area.

When it is determined that a motion subject continues being present during a plurality of past frames, the importance level indicating that a motion subject is present is set.

<Level Setting Corresponding to Past Shooting Information>

Setting of the importance level is performed based on information about past shooting.

The camera is configured to perform driving for panning and tilting to carry out automatic subject search according to a method described below.

When the camera detects an automatic shooting trigger from image information which is being searched, an automatic shooting operation is performed. For example, the automatic shooting trigger can be detection of a person's facial expression such as smile or can be the magnitude of the final importance level of a subject, which is described below.

Furthermore, the operator can operate a release switch (SW) provided on the camera to manually start a shooting operation When the camera completes a shooting operation, past shooting information is stored and managed.

First, level setting corresponding to past shooting information for each area is described.

In each area obtained by division into areas performed as illustrated in FIGS. 6A to 6D, the number of shots in each area is stored and managed.

A method of managing past shooting information in each area is illustrated in FIG. 14, in which the number of shots is managed in each area indicated by the ordinate axis and in each time indicated by the abscissa axis.

Setting of the importance level for each area is performed based on the past shooting information in each area such as that illustrated in FIG. 14. Column "Present time to Time T1" indicates the number of shots performed in a period from the present time to the past time T1, and a weight coefficient thereof is assumed to be, for example, "1".

Column "Time T1 to Time T2" indicates the number of shots performed in a period from the past time T1 to the past time T2, and a weight coefficient thereof is assumed to be, for example, "0.8".

Column "Time T2 to Time T3" indicates the number of shots performed in a period from the past time T2 to the past time T3, and a weight coefficient thereof is assumed to be, for example, "0.5".

Column "Time T3 to Time T4" indicates the number of shots performed in a period from the past time T3 to the past time T4, and a weight coefficient thereof is assumed to be, for example, "0.2".

The numbers of shots are multiplied by the respective weight coefficients and the results of multiplication in the respective periods are added together, so that the weighted total number of shots in each area is calculated.

The total number of shots in the area Area1 becomes "0×1+0×0.8+0×0.5+2×0.2=0.4 shots", and the total number of shots in the area Area3 becomes "3×1+4×0.8+2×0.5+0× 0.2=7.2 shots".

Level setting corresponding to past shooting information for each area is performed by multiplying the total number of shots in each area by a level coefficient (the level coefficient being a minus value and being set in such a way as to decrease the importance level as the number of shots increases).

Furthermore, the past shooting information is fed back to, for example, <Setting of Importance level Corresponding to Person Information>, <Setting of Importance level Corresponding to Object Recognition Information>, and <Setting of Importance level Corresponding to Scene>, and also has an effect on each level setting.

FIG. 15 illustrates a table for managing past shooting information which is to be fed back to <Setting of Importance level Corresponding to Person Information>.

The number of past shots for each subject registered as personal registration (Asan, Bsan, Csan, Dsan, . . . ) is stored and managed.

As with the method described with reference to FIG. 14, a weight coefficient is set in each period, and the total number of shots is calculated for each registered subject.

A result obtained by multiplying the total number of shots by a level coefficient for level setting is added to the gain Ka, so that the past shooting information is fed back to <Level Setting Corresponding to Person Information>.

The level coefficient is a minus value and is set in such a way as to decrease the level as the number of shots increases. Furthermore, the gain Ka is set in such a way as not to become equal to or less than "0".

FIG. 16 illustrates a table for managing past shooting information which is to be fed back to <Setting of Importance level Corresponding to Object Recognition Information>. The number of past shots for each registered subject (dog, cat, . . . ) is stored and managed.

As with the method described with reference to FIG. 14, weight coefficients are set in the respective periods.

The total number of shots is calculated for each registered subject, and a result obtained by multiplying the total number of shots by a level coefficient for level setting is added to the level setting corresponding to each subject, so that the past shooting information is fed back to <Level Setting Corresponding to Object Recognition Information>.

The level coefficient is a minus value and is set in such a way as to decrease the level as the number of shots increases. Furthermore, the importance level corresponding to each subject is set in such a way as not to become equal to or less than "0".

FIG. 17 illustrates a table for managing past shooting information which is to be fed back to <Setting of Importance level Corresponding to Scene>.

The numbers of past shots in the respective scenes (blue sky, evening view, natural verdure, night view, . . . ) are stored and managed.

As with the method described with reference to FIG. 14, weight coefficients are set in the respective periods.

The total number of shots is calculated for each registered subject, and a result obtained by multiplying the total number of shots by a level coefficient for level setting is added to the level setting corresponding to each subject, so that the past shooting information is fed back to <Level Setting Corresponding to Scene>.

The level coefficient is a minus value and is set in such a way as to decrease the level as the number of shots increases. Furthermore, the importance level corresponding to each scene is set in such a way as not to become equal to or less than "0".

<Setting of Importance Level According to Unsearched Time>

Setting of the importance level corresponding to the elapsed time from the last searching in each area obtained by division into areas as illustrated in FIGS. 6A to 6D.

Figure 18:
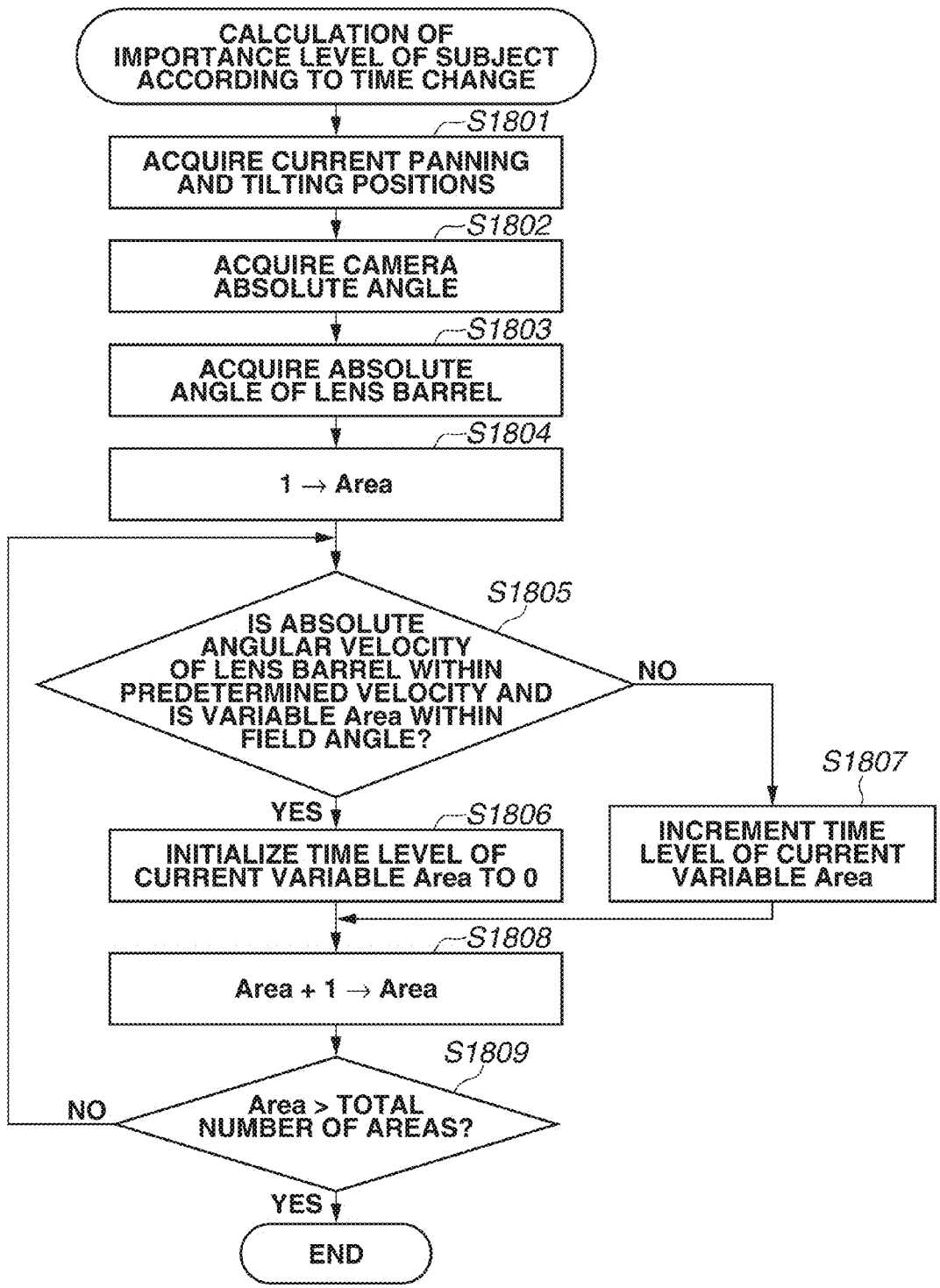
FIG. 18 is a flowchart illustrating computation using a search elapsed time in an exemplary embodiment of the subject disclosure.

FIG. 18 is a flowchart illustrating this processing. With the processing started, in step S1801, the control unit 212 acquires the current panning and tilting positions, and the processing then proceeds to step S1802.

In step S1802, the control unit 212 acquires the camera absolute angle calculated in the method described above with reference to FIGS. 6A to 6D, and the processing then proceeds to step S1803.

In step S1803, the control unit 212 calculates the absolute angle of the lens barrel 102 from the panning and tilting positions acquired in step S1801 and the camera absolute angle acquired in step S1802, and the processing then proceeds to step S1804.

In step S1804, the control unit 212 substitutes "1" for "Area", which is a variable for loop computation, and the processing then proceeds to step S1805.

In step S1805, the control unit 212 determines whether the absolute angular velocity calculated by performing differential processing on the absolute angle of the lens barrel 102 is within a predetermined velocity, and, while area numbers are defined in the respective areas obtained by division into areas performed as illustrated in FIGS. 6A to 6D, the control unit 212 determines whether the variable Area corresponds to an area number of one f areas included in the field angle.

If it is determined that the variable Area corresponds to an area included in the field angle and the lens barrel absolute angular velocity is such a velocity as to allow detection of each subject (a velocity according to which a delay time required until a subject is detected from an image is within a predetermined value in view of an imaging delay and a detection time delay) (YES in step S1805), the processing proceeds to step S1806.

In step S1806, the control unit 212 sets the importance level corresponding to an unsearched time of the current variable Area to "0", and the processing then proceeds to step S1808.

If, in step S1805, it is determined that the variable Area corresponds to no area included in the field angle or the lens barrel absolute angular velocity is greater than the predetermined angular velocity (NO in step S1805), the processing proceeds to step S1807.

In step S1807, the control unit 212 increments the time level of the current variable Area, and the processing then proceeds to step S1808. In step S1808, the control unit 212 increments the variable Area, and the processing then proceeds to step S1809. In step S1809, the control unit 212 determines whether the variable Area is greater than the total number of areas, and, if it is determined that the variable Area is greater than the total number of areas (YES in step S1809), the processing ends.

If it is determined that the variable Area is equal to or less than the total number of areas (NO in step S1809), the processing returns to step S1805, so that the control unit 212 repeats the processing in steps S1805 to S1809.

In the above-described method, the importance level corresponding to an unsearched time is set for each area.

Since the time level of each area becomes greater according to the elapsed time from when searching for a subject is last performed in an area (the unsearched time of an area), if there is an area in which searching is not yet performed for a long time, the importance level of the area is increased, so that searching in the area is started with panning and tilting.

<Setting of Importance level According to Vibrational State of Camera>

The control unit 212 performs setting of the importance level according to the vibrational state of the camera, which serves as an imaging apparatus including a vibration detection unit.

The control unit 212 determines a vibration state of the camera (a vehicle movement state, a placement shooting state, or a hand-held state) based on a result of determination of the camera state calculated in step S308.

In a case where the camera vibration state is the "placement shooting state", since the camera absolute angle computation is not performed incorrectly and the reliability of computation of the importance level for each area is high, the control unit 212 directly uses the importance level of a subject in each area computed up to this time to perform subject search control.

In a case where the camera vibrational state detected by the vibration detection unit is the "vehicle movement state", since the movement speed is high, while there is little change in the area of a person sitting in the vehicle, a subject such as a landscape changes from moment to moment.

Therefore, in the case of the vehicle movement state, the control unit 212 directly uses the importance level in <Setting of Importance Level Corresponding to Person Information>, but does not use the importance level in <Setting of Importance Level Corresponding to Image Motion Information>.

Furthermore, since <Setting of Importance Level Corresponding to Scene> or <Setting of Importance Level Corresponding to Object Recognition Information> is more likely to change quickly, the control unit 212 lowers the importance level.

However, in an automatic shooting operation, for example, a method of immediately performing shooting upon detection of a subject can be contrived. The control unit 212 directly uses the importance level in <Setting of Importance Level. Corresponding to Speech Information> or <Level Setting Corresponding to Past Shooting Information>.

Furthermore, the control unit 212 can also perform a computation operation of, for example, detecting the movement direction of the camera, detecting the direction of the high-speed movement with, for example, an acceleration sensor, and raising the importance level of an area located in the movement direction in advance.

In a case where the vibrational state of the camera is the "hand-held state" (the state in which blur vibration is large), the operator is likely to operate the direction of the camera.

Therefore, in areas in the range of ±45 degrees from the camera normal position (in which the tilting angle and the panning angle are 0 degrees), the control unit 212 increases the importance level.

Then, the control unit 212 sets the importance level of each area in such a way as to decrease the importance level in areas in the range from ±45 degrees to ±90 degrees and to further decrease the importance level in areas in the range away from ±90 degrees.

The control unit 212 can employ a method of incrementing the importance level on an area-by-area basis, or can employ a method of weighting the importance level calculated for each area according to the range.

The weight coefficient is set to 1 in areas in the range of ±45 degrees, the weight coefficient is set to less than 1 in areas in the range from ±45 degrees to ±90 degrees, and the weight coefficient is set to a further reduced value in areas in the range away from ±90 degrees.

According to the above-described method, the control unit 212 changes each importance level computation based on the vibrational state of the camera and performs subject search corresponding to each vibrational state.

The control unit 212 changes weighting of the importance level of a subject set for each of the areas using the vibrational state detected by a vibration detection unit which detects the vibrational state of an imaging apparatus.

The control unit 212 adds together the importance levels in the respective areas obtained in the above-described method.

The control unit 212 adds together the importance level corresponding to person information, the importance level corresponding to object recognition information, the importance level corresponding to a scene, the importance level corresponding to speech information, the importance level corresponding to image motion information, the importance level corresponding to past shooting information, and the importance level corresponding to an unsearched time.

The control unit 212 calculates the importance level of a subject using a result of the addition, and the processing then proceeds to step S313.

In step S313, the control unit 212 calculates a target angle for panning and tilting search based on the importance level of a subject for each area, and the processing then proceeds to step S314. The target angles for panning and tilting search are calculated in the following method.

First, the control unit 212 calculates a searching final level based on importance levels of a subject in each area and in areas adjacent to each area.

Figures 19A, 19B:
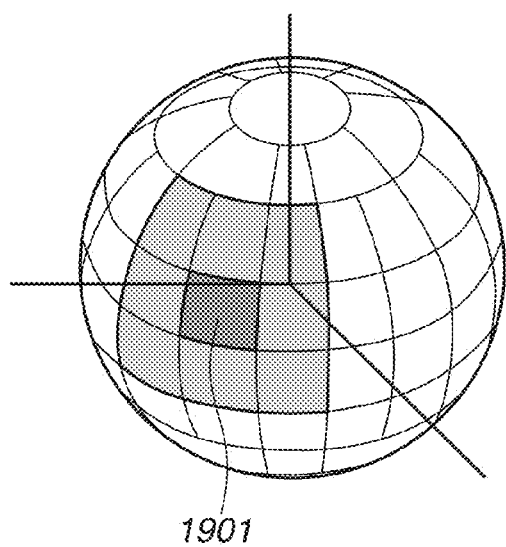

The searching final level in an area 1901 illustrated in FIG. 19A is computed based on information about the area 1901 and its surrounding areas (1902, 1903, 1904, 1905, 1906, 1907, 1908, and 1909).

Then, the control unit 212 sets the weight coefficient of the area 1901 to "1", sets the weight coefficients of the other areas to equal to or less than "1" (for example, "0.5"), multiplies the importance levels of a subject of the respective areas by the associated weight coefficients, and adds together the calculated values obtained in all of the areas, thus calculating the searching final level.

The control unit 212 performs this computation with respect to all of the areas and thus calculates the searching final level in each area.

Next, the control unit 212 sets an area the searching final level of which is largest as a search target area.

In a case where the search target area is the area 1901 illustrated in. FIGS. 19A and 19B, the control unit 212 calculates panning and tilting search target angles y based an the searching final levels of the areas 1901 to 1909 and the center angles of the areas 1901 to 1909 according to the following formula (5).

$$y = \sum_{i=1}^{n} \left( b_i \times \frac{a_i}{\sum_{i=1}^{n} a_i} \right) \quad (5)$$

where n is the number (9) of the areas 1901 to 1909, i is a variable defining the areas 1901 to 1909 as "1" to "9", b is the center angle of each area, and a is the searching final level of each area.

The control unit 212 calculates the panning and tilting search target angles y by computing the position y of the center of gravity of an angle which is based on the searching final levels computed as described above between the areas 1901 to 1909 (y being computed in each of the tilting direction and the panning direction).

Furthermore, in a case where all of the values of the searching final levels in the respective areas are equal to or less than a predetermined threshold value, since it is determined that there is no important subject at that time even when the areas are searched, the control unit 212 is configured not to perform panning and tilting driving.

At this time, the control unit 212 computes the target angle based on a subject importance degree calculated under a condition excluding <level setting corresponding to past shooting information>.

Then, after performing panning and tilting driving to the target angles, the control unit 212 holds the camera at that angle position until any one of the searching final levels of the respective areas becomes greater than the predetermined threshold value.

The control unit 212 calculates the panning and tilting search target angles in the above-described way, and the processing then proceeds to step S314.

In step S314, the control unit 212 calculates panning and tilting driving amounts based on the image blur correction amount obtained in step S306 and the panning and tilting search target angle obtained in step S313.

The control unit 212 calculates the panning and tilting driving amounts (calculates both the driving angle for panning and the driving angle for tilting) by adding the image blur correction amount and the driving angle used for control sampling which is based on the panning and tilting search target angles, and the processing then proceeds to step S315.

In step S315, the control unit 212 causes the lens barrel rotary driving unit 213 to control driving of the tilting rotation unit 104 and the panning rotation unit 105 according to the driving angles for tilting and panning, respectively, and the processing then proceeds to step S316.

The control unit 212 changes the center position of the field angle of a captured image in which to search for a subject by controlling driving of the tilting rotation unit 104 and the panning rotation unit 105 in step S315.

The control unit 212 can employ another method of clipping a specific portion of a captured image to change the center position of the field angle of the captured image.

In step S316, the control unit 212 determines whether a shooting instruction has been manually issued by an operation performed on the operation unit 211, and, if it is determined that the shooting instruction has been manually issued (YES in step S316), the processing proceeds to step S319.

Then, in step S319, the control unit 212 starts shooting to capture a still image and records the captured image on the image recording unit 207. If, in step S316, it is determined that the shooting instruction has not been manually issued (NO in step S316), the processing proceeds to step S317, in which the control unit 212 performs automatic shooting determination processing.

In the automatic shooting determination processing in step S317, if the importance level of a subject among the importance levels in the respective areas obtained until step S315 exceeds a predetermined value, it is determined that the automatic shooting operation is set to ON.

Alternatively, even when the importance level of a subject does not exceed a predetermined value, automatic shooting determination can be performed based on the degree of smile of the detected face, or automatic shooting determination can be performed based on the closeness in distance between a plurality of detected faces.

Furthermore, it an object (for example, a dog or cat) or a scene (for example, a blue sky, evening view, night view, or natural verdure) the image of which was not captured in the past is detected, automatic shooting determination can be performed. After automatic shooting determination is performed in step S317, the processing proceeds to step S318.

If, in step S318, it is determined that a result of the automatic shooting determination is ON of the automatic shooting operation (YES in step S318), the processing proceeds to step S319, in which the control unit 212 starts shooting of a still image.

If, in step S318, it is determined that a result of the automatic shooting determination is OFF of the automatic shooting operation (NO in step S318), the processing returns to step S302, so that the control unit 212 repeats automatic subject search and automatic shooting processing.

After still image shooting is performed in step S319, the processing proceeds to step S320, in which the control unit 212 changes parameters used for performing automatic subject search, based on subject information or area information in the shooting field angle obtained at the time of shooting performed in step S319.

In management of the past shooting information, as mentioned with reference to FIGS. 13A to 13C to FIG. 16, for example, analysis of a captured image or area information obtained at the time of shooting is managed according to time.

While management at the time of shooting of a still image has been described as an example, even in the case of shooting of a moving image, automatic shooting or past shooting information can be managed in a similar way.

In the case of a moving image, past shooting information is managed based on shooting information about, for example, subject detection or shooting area in the process of shooting a moving image.

After the past shooting information is updated in step S320, the processing returns to step S302, so that the control unit 212 repeats automatic subject search and automatic shooting processing.

According to the above-described method in the first exemplary embodiment, automatic subject search and automatic shooting are repeatedly performed.

At this time, the space coordinates with the camera set on the origin thereof are divided into areas as angle regions, and the importance level of a subject is calculated for each area obtained by division into areas.

In the present exemplary embodiment, the center position of the field angle of a captured image in which to search for a subject is changed using a changing unit which changes the center position of the field angle of the captured image based on the importance level of a subject calculated for each area.

Therefore, it is possible to concentrate an searching an area for which the importance level of a subject is high, so that it becomes unnecessary to make searching while constantly performing large panning and tilting.

Furthermore, shooting information (for example, the face recognition or object recognition of a subject of the captured image or a scene) is fed back to calculation of the importance level of a subject, so that automatic shooting can be comprehensively performed.

Therefore, automatic subject search and automatic shooting with little wasteful operation can be performed, so that quick subject search effect and power saving effect can be attained.

While, in the first exemplary embodiment (FIGS. 6A to 6D), an example of division into areas with an angle of 22.5 degrees has been described, in a second exemplary embodiment, a case where the camera focal length is long and the shooting field angle is narrow is considered.

In that case, if the area division angle is too large, the region usable for determination from a captured image becomes narrow relative to the area range, so that it would become difficult to perform subject search from information included in an image.

in most cases, the focal length becoming larger includes a case where the distance to a subject to be shot becomes larger.

Therefore, the control unit 212 changes the size of each area according to the focal length. For example, the control unit 212 performs setting in such a manner that the size (angular range) of each size becomes ½ of the vertical field angle.

Figure 20A:
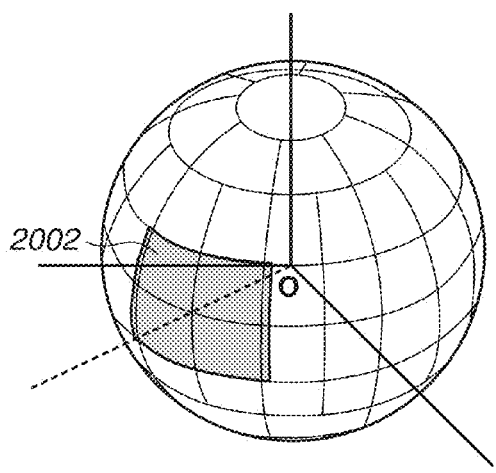
FIGS. 20A and 20B illustrate division into areas for respective angle regions in space coordinates of an imaging apparatus according to an exemplary embodiment of the subject disclosure.
Figure 20B:
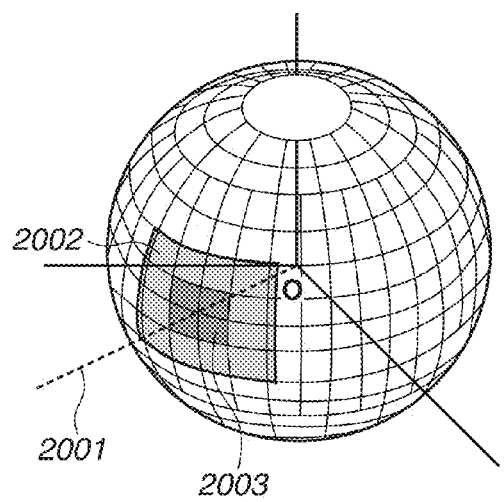

In a case where the vertical field angle is 45 degrees, the control unit 212 performs division into areas with 22.5 degrees (FIG. 20A), and, in a case where the vertical field angle is 22 degrees, the control unit 212 performs division into areas with 11 degrees (FIG. 20B).

In a case where the vertical field angle is 10 degrees, the control unit 212 performs division into areas with 5 degrees, thus facilitating area determination in a field angle used for shooting.

In a practical usage, for example, first, the control unit 212 performs division into areas as illustrated in FIG. 20A so as to make a rough subject search at the wide-angle side (the vertical field angle being 45 degrees and the size of each area being 22.5 degrees).

At this time, the control unit 212 does not limit a subject search range and performs subject search in the range of ±180 degrees. When finding an appropriate subject at this time, the control unit 212 performs automatic shooting and tracking operation.

If it is determined that the subject distance in an area automatically searched is long and it is better to increase the focal length so as to shoot an appropriate subject, the control unit 212 increases the focal length by zooming up and then re-performs subject search.

At this time, the control unit 212 concurrently decreases the size of each area (the vertical field angle being 22 degrees and the size of each area being 11 degrees) and limits the search range.

For example, a field angle used when a rough search is performed is assumed to be set as the search range. In the example illustrated in FIGS. 20A and 20B, the search range is a range of ±22.5 degrees centering on the angle 2001 set for subject search at the wide-angle side.

After limiting the search range, the control unit 212 re-performs subject search in a reduced area, calculates the importance level of a subject in the reduced area according to a similar method, mechanically drives panning and tilting to the target angles based on the calculated importance level of a subject, performs subject search, and performs automatic shooting and tracking operation.

As described above, in the method according to the second exemplary embodiment, the size of each area obtained by division into areas is changed based on the size of the shooting field angle caused by a change of the focal length, so that appropriate automatic subject search corresponding to the shooting field angle can be performed.

In a third exemplary embodiment, the search apparatus can also be applied to an imaging system which captures an omnidirectional image at a time using a plurality of wide-angle lenses (hereinafter referred to as an "omnidirectional camera").

The omnidirectional camera also performs division into areas for each angle region in the absolute space coordinates with the camera set at the origin thereof, and calculates the importance level of a subject for each area obtained by division into areas.

Then, the omnidirectional camera sets an area in which to perform image processing for detecting a subject in an image according to the importance level of a subject for each area, thus enabling a reduction in power consumption and a high-speed subject search by shortening of image processing.

A subject search apparatus includes an absolute angle calculation unit which calculates the absolute angle of an imaging apparatus based on a vibration amount output from a vibration detection unit which detects a vibration of the imaging apparatus.

A division unit performs division into areas for each angle region in absolute space coordinates using the absolute angle.

The subject search apparatus includes a determination unit which determines the reliability of the absolute angle.

In a case where it is determined by the determination unit that the reliability of the absolute angle is lower than a predetermined value, the subject search apparatus initializes a result of division performed by the division unit, and re-calculates an area for each angle region in the absolute space coordinates.

<Distortion Correction and Projective Transformation>

The omnidirectional camera performs distortion correction and projective transformation on each image captured through each lens optical system based on a predetermined projective model.

Figure 21A:
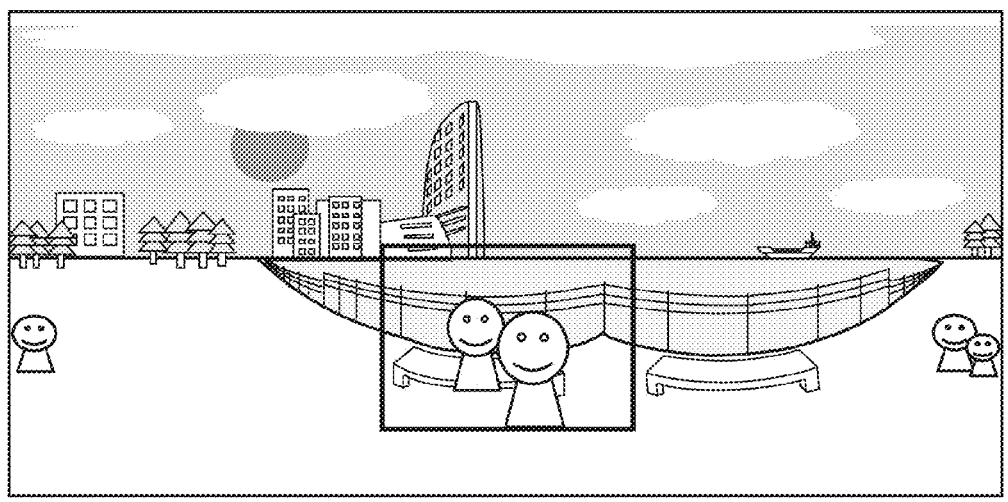
FIGS. 21A and 21B illustrate a captured image obtained by an imaging apparatus according to an exemplary embodiment of the subject disclosure.
Figure 21B:
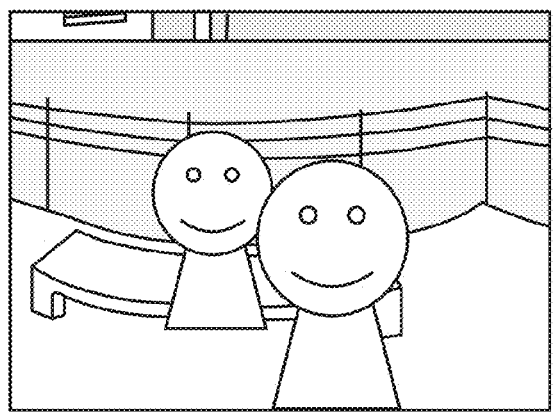

Then, the omnidirectional camera performs processing for joining images based on overlapping portions of the images to generate an omnidirectional image. The omnidirectional camera can also acquire an image in which a subject is zoomed up by extracting a partial image region (FIG. 21B) from the captured omnidirectional image (FIG. 21A).

Here, a subject search method in a system which performs automatic shooting based on detection information about a subject using the omnidirectional camera is described.

Figure 22A:
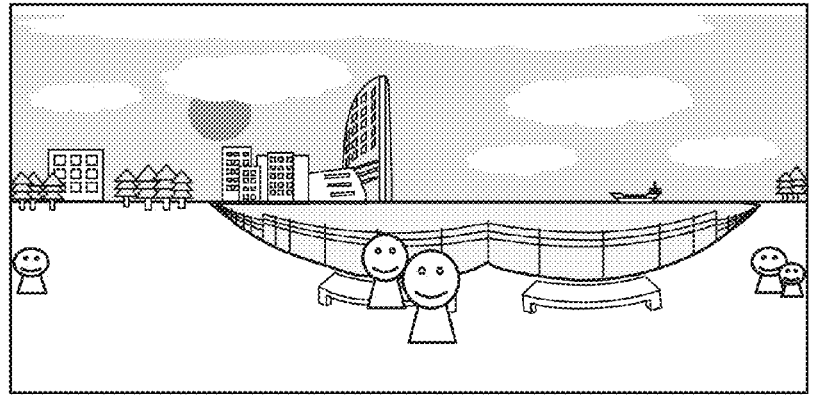
FIGS. 22A, 22B, and 22C illustrate division into areas for respective angle regions in space coordinates of the imaging apparatus according to an exemplary embodiment of the subject disclosure.

An image captured with the entire field angle (360 degrees) by the omnidirectional camera is generated in, for example, an equidistant cylindrical projection (equirectangular) method, and is shown as illustrated in FIG. 22A.

Here, the omnidirectional camera performs resizing of an input image for subject detection processing.

Processing such as that for subject detection requires a huge amount of processing if processing is performed on all of the pixels in a case where, for example, an input image includes 4000×3000 pixels.

In the subject detection processing, the overall amount of processing is decreased by reducing the resolution to a resolution only available for acquiring a feature of the image and performing processing on the reduced image.

Here, while a reduction algorithm or a reduced resolution is not specified, a reduction into, for example, a Video Graphics Array (VGA) size (640×480 pixels) is effective.

However, in the omnidirectional camera, since the field angle is very large, the size of a subject (for example, a face) is apt to become small, and, if subject detection processing is performed in the entire field angle, it is difficult to accurately detect a subject (for example, a face).

Therefore, the omnidirectional camera divides the area range into areas and performs subject detection processing on each area obtained by division into areas.

First, the omnidirectional camera performs, for example, rough subject detection or scene discrimination in the image illustrated in FIG. 22A with 640×480 pixels.

Figure 22B:
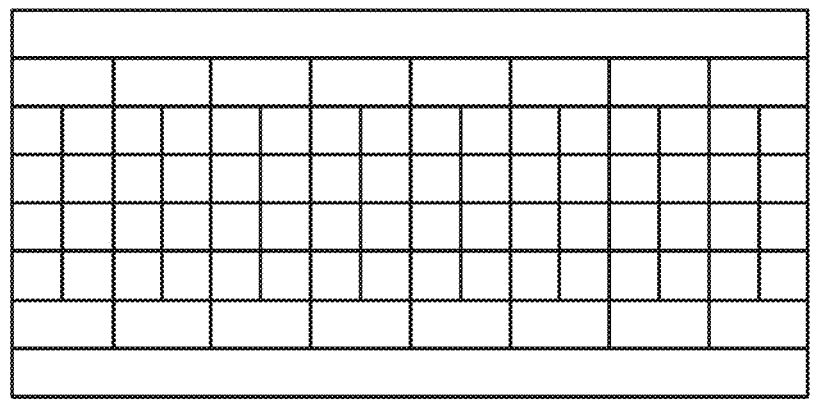

Since a blue sky is shown in an upper range of the screen as illustrated in FIG. 22A, the image is determined to be a blue sky scene, and the importance level of a subject in a blue sky scene is also set in each area finely set as illustrated in FIG. 22B.

Figure 22C:
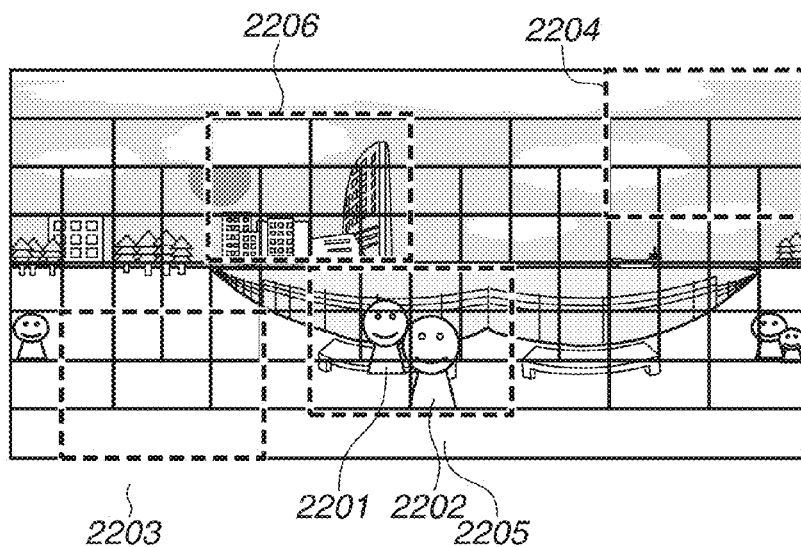

Furthermore, if the face (subject) with a size having such pixels as to enable detecting a face such as that 2201 or 2202 illustrated in FIG. 22C is shown, the face subject level setting is performed on each area in which the face is shown among the areas illustrated in FIG. 22B.

In a similar way, the omnidirectional camera performs subject determination, such as detection of a natural verdure scene or object detection, in the image illustrated in FIG. 22A according to the method described in the first exemplary embodiment.

Next, the omnidirectional camera acquires an image used for detecting a subject by reading out a partial region of the captured image (with 640×480 pixels) based on the importance level of a subject for each area illustrated in FIG. 22B determined in the image illustrated in FIG. 22A.

At this time, it is determined that, with respect to a region in which there is little contrast, such as a region 2203 or 2204, there is no possibility of a characteristic subject being found even if a partial region of the captured image is read out and is subjected to fine subject detection.

Therefore, such regions as those 2203 and 2204 are not read out, and the importance level of a subject for each area is not re-performed in such regions.

With respect to a region in which an important subject such as a face has already been detected, such as a region 2205, or a region in which the dispersion of color or luminance is large and some kind of subject is likely to be detected, such as a region 2206, the omnidirectional camera reads out a partial region of the captured image and re-performs fine subject detection.

For example, the omnidirectional camera re-performs subject detection processing in the region 2205, and, if the detected person 2202 is a person registered with face authentication, the omnidirectional camera raises the importance level of a subject for the associated area.

Finally, when it is determined that the region the importance level of a subject for which is largest is the region 2205, the omnidirectional camera enters a shooting waiting state and sequentially performs subject detection in an image region including and around the region 2205.

Then, the omnidirectional camera performs automatic shooting according to the magnitude of, for example, a change in facial expression of a person (for example, the degree of smile), and feeds back a result of automatic shooting to the computation of the importance level of a subject for each area according to a method similar to that in the first exemplary embodiment.

Then, the omnidirectional camera sets a region in which to perform subject detection processing based on the updated importance level of a subject for each area, reads out a partial region of the captured image to finely perform subject detection, and repeats subject search and automatic shooting.

According to the above-described method, the omnidirectional camera also performs division into areas for each angle region in the space coordinates with the camera set as the origin thereof, and calculates the importance level of a subject for each area obtained by division into areas.

The subject search apparatus includes an imaging optical system available for omnidirectional shooting and a changing unit which clips a specific portion of the captured image from the omnidirectional image.

Then, the subject search apparatus sets an area in which to perform subject detection in an image according to the importance level of a subject for each area, thus enabling a reduction in power consumption and a high-speed subject search by image processing.

Aspects of the disclosure can also be implemented in the following manners. A storage medium storing program code of software in which the procedure for implementing the functions of each of the above-described exemplary embodiments is written is supplied to a system or apparatus. Then, a computer (alternatively, a central processing unit. (CPU) or a microprocessing unit (MPU)) of the system or apparatus reads out and executes the program code stored in the storage medium.

In this case, the program code itself read out from the storage medium implements the novel functions of the disclosure, and a storage medium and a program storing the program code configure the disclosure.

Furthermore, examples of the storage medium for supplying the program code include a flexible disc, a hard disk, an optical disc, and a magneto-optical disc. Moreover, for example, a CD-ROM, a CD-R, a CD-RW, a DVD-ROM, a DVD-RAM, a DVD-RW, a DVD-R, a magnetic tape, a non-volatile memory card, and a ROM can also be used.

Additionally, making the program code read out by the computer executable enables implementing the functions of each of the above-described exemplary embodiments. Besides, for example, an operating system (OS) running on a computer can perform a part or the whole of the actual processing based on an instruction of the program code, and the functions of each of the above-described exemplary embodiments can be implemented by the processing.

Furthermore, the following operation can also be performed. First, program code read out from a storage medium is written into a memory included in a function expansion board inserted into the computer or a function expansion unit connected to the computer. Then, for example, a CPU included in the function expansion board or function expansion unit performs a part or the whole of the actual processing based on an instruction of the program code.

Moreover, the disclosure can be applied to not only an apparatus primarily intended to capturing an image, such as a digital camera, but also an optional apparatus having an imaging apparatus incorporated therein connected externally, such as a mobile phone, a personal computer (for example, laptop type, desktop type, or tablet type), and a gaming machine. Accordingly, the term "imaging apparatus" in the context of the present specification is intended to involve an optional electronic apparatus having an image capturing function.

The present disclosure can also be implemented by supplying a program for implementing one or more functions of the above-described exemplary embodiments to a system or apparatus via a network or a storage medium and causing one or more processors in a computer of the system or apparatus to read out and execute the program. Moreover, the present disclosure can also be implemented by a circuit that implements one or more functions (for example, an application specific integrated circuit (ASIC)).

The present disclosure can be applied to not only image capturing by a digital camera or a digital still camera but also an imaging apparatus of, for example, a monitoring camera, a web camera, or a mobile phone.

According to a subject search apparatus in the present disclosure, in a case where there is no characteristic subject or with respect to a subject the image of which has already been captured, the necessity of performing driving for a subject search operation becomes small, so that quick subject search and power saving effect can be attained.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-183797 filed Sep. 21, 2016, which is hereby incorporated by reference herein in its entirety.

What is claimed is:

1. A search apparatus comprising:
   a division unit configured to divide an image on an imaging plane into areas for respective angle regions in space coordinates with an imaging apparatus set as an origin thereof;
   a calculation unit configured to calculate an importance level of a subject for each of the areas obtained by division; and
   a changing unit configured to change a center position of a field angle of a captured image in which to search for a subject based on the importance level of a subject calculated for each of the areas,
   wherein each of the division unit, calculation unit and changing unit are implemented by one or more processors, circuitry, or a combination thereof,
   wherein the changing unit changes the center position of the field angle to an area the importance level of a subject for which is largest among the areas, and
   wherein the changing unit calculates a position of a center of gravity based on the importance levels of a subject of the area the importance level of a subject for which is largest among the areas and an area adjacent to the area the importance level of a subject for which is largest, and changes the center position of the field angle to the position of the center of gravity.

2. The search apparatus according to claim 1, wherein, in a case where all of the importance levels of a subject of the areas are smaller than a predetermined threshold value, the changing unit does not change the center position of the field angle of the captured image.

3. The search apparatus according to claim 1, wherein the calculation unit calculates the importance level of a subject for each of the areas obtained by division using information about a subject.

4. The search apparatus according to claim 1, wherein the calculation unit calculates the importance level of a subject for each of the areas using information about a subject including at least one of reliability of a face, detection information about a facial expression, and registration information for personal authentication.

5. The search apparatus according to claim 1, wherein the calculation unit calculates the importance level of a subject for each of the areas using object recognition previously registered as information about the subject.

6. The search apparatus according to claim 1, wherein the calculation unit calculates the importance level of a subject for each of the areas using a result of detection by a scene detection unit that detects a scene using color information about the subject or luminance information about the subject.

7. The search apparatus according to claim 1, wherein the calculation unit calculates the importance level of a subject for each of the areas using a motion vector detected by a motion detection unit that is configured to detect a motion vector of the subject.

8. The search apparatus according to claim 1, wherein the calculation unit calculates the importance level of a subject for each of the areas using information about a subject including at least one of a speech direction, a speech level, and a speech recognition.

9. The search apparatus according to claim 1, wherein the changing unit changes the center position of the field angle of the captured image by mechanically rotating an optical axis of the imaging apparatus around an axis perpendicular to the optical axis of the imaging apparatus.

10. The search apparatus according to claim 1, further comprising a zoom unit configured to perform optical variation of magnification by driving a zoom lens of an imaging optical system,
    wherein the changing unit changes a size of each of the areas obtained by the division unit according to a shooting field angle corresponding to a position of the zoom lens.

11. The search apparatus according to claim 1, wherein the changing unit clips a specific portion of the captured image to change the center position of the field angle of the captured image.

12. The search apparatus according to claim 1, further comprising an imaging optical system available for capturing an omnidirectional image,
    wherein the changing unit clips a specific portion of the captured image from the omnidirectional image.

13. A search apparatus comprising:
    a division unit configured to divide an image on an imaging plane into areas for respective angle regions in space coordinates with an imaging apparatus set as an origin thereof;
    a calculation unit configured to calculate an importance level of a subject for each of the areas obtained by division; and
    a changing unit configured to change a center position of a field angle of a captured image in which to search for a subject based on the importance level of a subject calculated for each of the areas,
    wherein each of the division unit, calculation unit and changing unit are implemented by one or more processors, circuitry, or a combination thereof, and
    wherein the calculation unit calculates the importance level of a subject for each of the areas using information about a number of past shots including at least one of a number of past shots, a number of past shots of a previously set subject registered for personal authentication, a number of past shots of previously set object recognition information, and a number of past shots of a previously set scene.

14. A search apparatus comprising:
a division unit configured to divide an image on an imaging plane into areas for respective angle regions in space coordinates with an imaging apparatus set as an origin thereof;
a calculation unit configured to calculate an importance level of a subject for each of the areas obtained by division; and
a changing unit configured to change a center position of a field angle of a captured image in which to search for a subject based on the importance level of a subject calculated for each of the areas,
wherein each of the division unit, calculation unit and changing unit are implemented by one or more processors, circuitry, or a combination thereof, and
wherein the calculation unit calculates the importance level of a subject for each of the areas using an elapsed time from a last search of each of the areas.

15. A search apparatus comprising:
a division unit configured to divide an image on an imaging plane into areas for respective angle regions in space coordinates with an imaging apparatus set as an origin thereof;
a calculation unit configured to calculate an importance level of a subject for each of the areas obtained by division; and
a changing unit configured to change a center position of a field angle of a captured image in which to search for a subject based on the importance level of a subject calculated for each of the areas,
wherein each of the division unit, calculation unit and changing unit are implemented by one or more processors, circuitry, or a combination thereof, and
wherein the calculation unit calculates a weight of the importance level of a subject set for each of the areas using a vibration state detected by a vibration detection unit that detects the vibration state of the imaging apparatus.

16. A search apparatus comprising:
a division unit configured to divide an image on an imaging plane into areas for respective angle regions in space coordinates with an imaging apparatus set as an origin thereof;
a calculation unit configured to calculate an importance level of a subject for each of the areas obtained by division;
a changing unit configured to change a center position of a field angle of a captured image in which to search for a subject based on the importance level of a subject calculated for each of the areas; and
absolute angle calculation unit configured to calculate an absolute angle of the imaging apparatus from a vibration amount output from a vibration detection unit that detects a vibration of the imaging apparatus
wherein each of the division unit, calculation unit and changing unit are implemented by one or more processors, circuitry, or a combination thereof, and
wherein the division unit performs division into areas for respective angle regions in the space coordinates using the absolute angle.

17. The search apparatus according to claim 16, further comprising a determination unit configured to determine reliability of the absolute angle,
wherein, in a case where it is determined by the determination unit that the reliability of the absolute angle is lower than a predetermined value, the division unit initializes a result of the division and re-calculates the areas for respective angle regions.

18. A search method, comprising: dividing an image on an imaging plane into areas for respective angle regions in space coordinates with an imaging apparatus set as an origin thereof;
calculating an importance level of a subject for each of the areas obtained by division; and
changing a center position of a field angle of a captured image in which to search for a subject based on the importance level of a subject calculated for each of the areas,
wherein a division unit is configured for the dividing, a calculation unit is configured for the calculating, and a changing unit is configured for the changing,
wherein each of the division unit, calculation unit and changing unit are implemented by one or more processors, circuitry, or a combination thereof,
wherein the changing unit changes the center position of the field angle to an area the importance level of a subject for which is largest among the areas, and
wherein the changing unit calculates a position of a center of gravity based on the importance levels of a subject of the area the importance level of a subject for which is largest among the areas and an area adjacent to the area the importance level of a subject for which is largest, and changes the center position of the field angle to the position of the center of gravity.

19. A search method comprising: dividing an image on an imaging plane into areas for respective angle regions in space coordinates with an imaging apparatus set as an origin thereof;
calculating an importance level of a subject for each of the areas obtained by division; and
changing a center position of a field angle of a captured image in which to search for a subject based on the importance level of a subject calculated for each of the areas,
wherein a division unit is configured for the dividing, a calculation unit is configured for the calculating, and a changing unit is configured for the changing,
wherein each of the division unit, calculation unit and changing unit are implemented by one or more processors, circuitry, or a combination thereof, and
wherein the calculation unit calculates the importance level of a subject for each of the areas using information about a number of past shots including at least one of a number of past shots, a number of past shots of a previously set subject registered for personal authentication, a number of past shots of previously set object recognition information, and a number of past shots of a previously set scene.

20. A search method comprising:
dividing an image on an imaging plane into areas for respective angle regions in space coordinates with an imaging apparatus set as an origin thereof;
calculating an importance level of a subject for each of the areas obtained by division; and
changing a center position of a field angle of a captured image in which to search for a subject based on the importance level of a subject calculated for each of the areas,
wherein a division unit is configured for the dividing, a calculation unit is configured for the calculating, and a changing unit is configured for the changing, wherein each of the division unit, calculation unit and changing unit are implemented by one or more processors, circuitry, or a combination thereof, wherein the calculation unit calculates the importance level of a subject for each of the areas using an elapsed time from a last search of each of the areas.

21. A search method comprising:

dividing an image on an imaging plane into areas for respective angle regions in space coordinates with an imaging apparatus set as an origin thereof;

calculating an importance level of a subject for each of the areas obtained by division; and changing a center position of a field angle of a captured image in which to search for a subject based on the importance level of a subject calculated for each of the areas, wherein a division unit is configured for the dividing, a calculation unit is configured for the calculating, and a changing unit is configured for the changing, wherein each of the division unit, calculation unit and changing unit are implemented by one or more processors, circuitry, or a combination thereof, and wherein the calculation unit calculates a weight of the importance level of a subject set for each of the areas using a vibration state detected by a vibration detection unit that detects the vibration state of the imaging apparatus.

22. A search method comprising:

dividing an image on an imaging plane into areas for respective angle regions in space coordinates with an imaging apparatus set as an origin thereof;

calculating an importance level of a subject for each of the areas obtained by division;

changing a center position of a field angle of a captured image in which to search for a subject based on the importance level of a subject calculated for each of the areas; and calculating an absolute angle of the imaging apparatus from a vibration amount output from a vibration detection unit that detects a vibration of the imaging apparatus wherein a division unit is configured for the dividing, a calculation unit is configured for the calculating, and a changing unit is configured for the changing, wherein each of the division unit, calculation unit and changing unit are implemented by one or more processors, circuitry, or a combination thereof, and wherein the division unit performs division into areas for respective angle regions in the space coordinates using the absolute angle.

* * * * *